United States Patent
Ogura et al.

(10) Patent No.: US 7,525,887 B2
(45) Date of Patent: Apr. 28, 2009

(54) PLAYBACK SIGNAL PROCESSING APPARATUS AND OPTICAL DISC DEVICE

(75) Inventors: Youichi Ogura, Saijo (JP); Toshihiko Takahashi, Kawachinagano (JP); Kazutoshi Aida, Hirakata (JP); Kouji Okamoto, Ikeda (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1013 days.

(21) Appl. No.: 10/871,062

(22) Filed: Jun. 21, 2004

(65) Prior Publication Data

US 2005/0018578 A1    Jan. 27, 2005

(30) Foreign Application Priority Data

Jun. 20, 2003   (JP)   ............................. 2003-176763

(51) Int. Cl.
*G11B 15/52*   (2006.01)

(52) U.S. Cl. .............. 369/47.28; 369/47.19; 369/53.34; 369/59.2

(58) Field of Classification Search ........................ None
See application file for complete search history.

(56) References Cited

U.S. PATENT DOCUMENTS

| 2003/0021208 A1* | 1/2003 | Ogura | ...................... 369/59.22 |
| 2006/0126467 A1* | 6/2006 | Roh et al. | ................ 369/47.53 |

FOREIGN PATENT DOCUMENTS

| JP | 05227042 | 9/1993 |
| JP | 2000123487 | 4/2000 |
| JP | 2002269925 | 9/2002 |

* cited by examiner

*Primary Examiner*—Paul Huber
(74) *Attorney, Agent, or Firm*—Wenderoth, Lind & Ponack, L.L.P.

(57) ABSTRACT

When generating a sampling clock of an A/D converter for digitizing a playback signal from an optical disc, an over sampling clock generated by a PLL is used. Further, zerocross position information and reference information of a playback digital signal that is obtained by A/D conversion using the over sampling clock are converted into those synchronized with the channel bit clock by an operation cycle conversion unit, and then supplied to a PRML signal processing unit and a level judgement binarization unit.

34 Claims, 15 Drawing Sheets

PLAYBACK SIGNAL PROCESSING APPARATUS AND OPTICAL DISC DEVICE

FIELD OF THE INVENTION

The present invention relates to a playback signal processing apparatus and an optical disc device and, particularly, to an over sampling type optical recording/playback apparatus for reproducing data which are digitally recorded on an optical disc. More particularly, the invention relates to an over sampling type optical recording/playback apparatus including a phase-locked pull-in control means, and a digital data demodulation means employing a PRML (Partial Response Maximum Likelihood) signal processing method that is effective to high-density recording/playback in a linear direction, thereby to realize improved quality of demodulated data and improved playback performance, simultaneously.

BACKGROUND OF THE INVENTION

As a method for recording digital data on an optical disc as an information storage medium, there has been commonly employed a method for uniformizing the recording density on a recording medium by making the linear velocity constant, as seen in a compact disc (registered trademark) (hereinafter referred to as a CD) and a digital versatile disc (hereinafter referred to as a DVD).

Conventionally, when reading digital data from an optical disc on which data are digitally recorded by performing mark width modulation so as to make the linear recording density constant, the phase of a clock component corresponding to a channel bit frequency possessed by the read signal is detected to constituted a phase-locked loop, thereby performing phase-locked pull-in. Further, in order to improve playback performance of high-density recordable media such as a DVD-RAM (DVD-Random Access Memory) and a BD (Blu-ray Disc), there has also been introduced a method of performing demodulation of digital data by using a PRML (Partial Response Maximum Likelihood) signal processing method that is effective to high-density recording/playback in the linear direction.

There has conventionally been a disc playback system shown in FIG. 17, as a system that enables the phase-locked pull-in, and realizes a digital signal processing method such as the PRML signal processing method.

In the conventional disc playback system, digital codes (NRZI (Non Return to Zero Invert) codes) as shown in the upper stage in FIG. 18 are recorded so that the linear recording density becomes constant. It is premised that the recorded data are data in which the number of continuous 0s or 1s is within a range from 3 to 14, like the 8-16 modulation method. An optical disc playback signal 73 that is obtained by playing the disc with an optical playback means 2 such as an optical pickup is attenuated in amplitude as the frequency band becomes higher due to interference with an increase in the recording density in the linear direction of the recorded data. So, the signal 73 is amplified by a preamplifier 3 and then subjected to correction so as to emphasize the high-frequency component by using a waveform equalization means 4, as shown in the upper stage in FIG. 18.

The high-frequency emphasized playback signal is sampled to a multiple-bit playback digital signal 63 by an analog-to-digital converter (AID converter) 5 that is a means for converting an analog signal into a digital signal by using a playback clock 64 generated by a VCO (Voltage Controlled Oscillator) 62. At this time, if the phase of the playback clock 64 is synchronized with the phase of the clock component possessed by the playback signal, sampling data as shown in the middle stage and the lower stage in FIG. 18 are obtained. The middle stage in FIG. 18 shows a sampling method in which binarization judgement is carried out at an arbitrary level, and the lower stage in FIG. 18 shows a sampling method that is particularly suited to the PRML signal processing method.

The PRML signal processing method is as follows. That is, in a playback system in which the amplitude of high-frequency component is degraded with an increase in linear-direction recording density and thereby the S/N ratio is increased, waveform interference is intentionally added by adopting the partial response method to realize a playback system that needs no high-frequency component, and moreover, the quality of playback data is improved by the maximum likelihood decoding method that estimates a most likely string by probability calculation considering the waveform interference (for example, refer to Japanese Published Patent Application No. 2002-269925 (Pages 5, 6, 12-14, FIGS. 3, 10, and 27)).

Then, the multiple-bit playback digital signal 63 outputted from the A/D converter 5 is input to an offset correction means 7 to correct an offset component included in the playback digital signal, i.e., an offset in the amplitude direction from the center level at which code balance is kept. The offset-corrected playback digital signal is demodulated to a digital binary signal by a PRML signal processing means 17 comprising a transversal filter and a Viterbi decoder. At this time, by adopting the partial response equalization, the equalized output signal outputted from the transversal filter to the Viterbi decoder is multi-valued to a quinary signal in the PRML signal processing means 17 (refer to the lower stage in FIG. 18). The quinary equalized output signal is subjected to probability calculation by the Viterbi decoder to generate a binary value.

Further, the playback clock 64 to be used for performing sampling by the A/D converter 5 is generated as follows.

Initially, a phase control amount for performing phase synchronization control between the playback clock and the playback digital signal is generated by a phase synchronization control means 10 comprising a phase comparator, a loop filter, and a D/A converter, using the output signal of the offset correction means 7. The VCO 62 is controlled on the basis of the phase control amount, and the playback clock 64 is obtained as an output of the VCO 62.

Through the series of processings described above, the phase of the playback clock is synchronized with the phase of the clock component possessed by the playback digital signal, and the PRML signal processing method is adopted, whereby the digital data recorded on the optical disc can be reproduced with stability and accuracy (for example, refer to Japanese Published Patent Application No. 2000-123487 (Page 4, FIG. 9)).

Furthermore, there has been proposed a signal processing apparatus in which an optical playback waveform is converted into a digital playback signal by an A/D converter using a clock of a frequency higher than the channel bit frequency, and a digital PLL is constituted utilizing an interpolation filter in the phase direction, thereby generating a phase-locked playback digital signal to perform digital data demodulation (for example, refer to Japanese Patent No. 3255179 (page 5, FIG. 1)).

In the conventional optical disc playback apparatus constituted as described above, the playback signal is converted into a multiple-bit discrete signal by the A/D converter using the channel bit clock that is synchronized with the channel bit frequency as a clock component possessed by the playback waveform from the optical disc, and the PLL (Phase Locked Loop) is constituted using the signal to carry out phase-locked pull-in control and data demodulation such as PRML signal processing.

However, when the PLL is constituted by using the multiple-bit discrete signal after AID conversion, which is generated on the basis of the channel bit clock, detection of phase error information or the like takes time, and therefore, the delay time of the control loop increases to degrade the phase-locked pull-in performance. As a result, the phase-locked pull-in control is initially failed against degradation in quality of the playback waveform due to a tilt that is defined by an angle formed between an axis perpendicular to the recording surface of the optical disc and an axis of the incoming laser beam, or local degradation in playback characteristics depending on playback under poor S/N ratio, asymmetry of upper and lower portions of the playback waveform, or defects such as flaws, contamination, and finger prints on the disc surface. Consequently, the effectiveness of the PRML signal processing method cannot be satisfactorily utilized.

Further, in the optical disc playback apparatus employing both of the PLL and the PRML signal processing means, it is possible to obtain two kinds of binary outputs, i.e., the binary output from the PRML signal processing means, and the binary output obtained by subjecting the output of the phase comparison means in the PLL to level judgement.

The binary output, which is obtained by judging the output of the phase comparison means as "1" ("0") when it is equal to or larger (smaller) than the level of the waveform (hereinafter referred to as a level judgement method), is resistant to flaws on the disc surface, and stable playback can be carried out even when a position having flaws is played. On the other hand, the binary output from the PRML signal processing means (hereinafter referred to as a PRML signal processing method) is resistant to the case where a DVD-R or DVD-RW having originally degraded signal quality is played, or to tilt degradation, and stable playback can be carried out even when playing the disc of low signal quality.

However, since the level judgement method and the PRML signal processing method are realized by changing the sampling method, it is impossible to realize, simultaneously and at maximum precision, the level judgement method that is stable against burst errors caused by defects or the like, and the PRML signal processing method that is effective to linear-direction high-density recording/playback. Therefore, an optimum detection method cannot be selected according to the playback condition. Further, since the information in the time direction is lost, the precision in detecting jitter information tends to deteriorate. As a result, there are cases where learning of cut-off frequency or boost amount during focus servo or waveform equalization does not converge to an optimum value due to considerable asymmetry or the like, leading to degradation in the playback performance.

On the other hand, since Japanese Patent No. 3255179 employs the over-sampling clock, it can solve the above-mentioned problem such as tilt degradation caused by the convergence speed of the PLL.

However, the over sampling method disclosed in Japanese Patent No. 3255179 is asynchronous over sampling method in which the relation between the channel bit frequency and the over sampling is not an integral multiple. The asynchronous over sampling has an advantage in that the PLL can be constituted by a synthesizer instead of a VCO whose circuit scale is relatively large. However, in the field of optical discs, with respect to DVD alone, plural kinds of optical discs have been put to practical use in recent years, and therefore, it is necessary to prepare synthesizers as many as the kinds of optical discs in order to deal with various kinds of optical disc playbacks with a single optical disc device, resulting in an increase in circuit scale. Further, the asynchronous over sampling method complicates the PRML circuit.

SUMMARY OF THE INVENTION

The present invention is made to solve the above-described problems and has for its object to provide a versatile playback signal processing apparatus which can reduce the delay time in a PLL to enhance the marginal playback performance when demodulating digital data recorded on an optical disc, thereby improving an output signal in the PRML signal processing mode that is advantageous for linear-direction high-density playback, and moreover, which can perform switching to an output signal in the level judgement mode in real time when burst errors occurs frequently due to defects or the like.

It is another object of the present invention to provide an optical disc device including the above-mentioned playback signal processing apparatus.

It is still another object of the present invention to provide a playback signal processing apparatus which can increase information in the time direction to enhance the jitter detection accuracy, thereby realizing optimum learning of focus servo or waveform equalization.

It is a further object of the present invention to provide an optical disc device including the above-mentioned playback signal processing apparatus.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, a playback signal processing apparatus includes: an over sampling phase synchronization unit for converting a playback waveform which is obtained by reproducing a digital signal recorded on an information storage medium with an information playback unit, into a multiple-bit discrete signal by using an over sampling clock that is synchronized with a frequency N times (N: a multiple of 2, N$\geq$2) as high as a frequency of a channel bit clock of the digital signal, and generating, from the multiple-bit discrete signal, first, second, and third digital data which have different phases and are synchronized with the frequency of the channel bit clock; and a digital data demodulation unit having a first demodulation unit for demodulating the first digital data, and a second demodulation unit for demodulating the second digital data or the third digital data. Since the over sampling clock is used, the loop delay time in the PLL is reduced, and thereby the marginal playback performance is enhanced. Furthermore, demodulated digital data according to different demodulation modes are simultaneously obtained from the first and second demodulation units, respectively.

According to a second aspect of the present invention, a playback signal processing apparatus includes: an over sampling phase synchronization unit for converting a playback waveform which is obtained by reproducing a digital signal recorded on an information storage medium with an information playback unit, into a multiple-bit discrete signal by using an over sampling clock that is synchronized with a frequency N times (N: a multiple of 2, N$\geq$2) as high as a frequency of a channel bit clock of the digital signal, and generating, from the multiple-bit discrete signal, first, second, and third digital data which have different phases and are synchronized with the frequency of the channel bit clock; and a jitter detection unit for detecting a jitter component of the playback waveform, using the first, second, and third digital data. Since the jitter component of the playback waveform is detected from the first, second, and third digital data in which information in the time direction is increased by using the over sampling clock, the jitter detection accuracy is improved.

According to a third aspect of the present invention, in the playback signal processing apparatus according to the first or second aspect, the over sampling phase synchronization unit comprises: an analog-to-digital conversion unit for converting the playback waveform into the multiple-bit discrete signal using the over sampling clock; a clock division unit for reducing the frequency of the over sampling clock to 1/N to generate a channel bit clock; a phase determination unit for uniquely determining the relationship in phases between the channel bit clock and the over sampling clock; an over sampling phase control unit for converting an output signal of the analog-to-digital conversion unit into a pre-demodulation signal and a control signal on the basis of an output signal of the phase determination unit; an operation cycle conversion unit for converting an output signal that is outputted from the over sampling phase control unit in synchronization with the over sampling clock, into a signal that operates in synchronization with the channel bit clock; and a phase synchronization control unit which operates in synchronization with the channel bit clock, for detecting phase error information from the output of the operation cycle conversion unit, and modulating the over sampling clock generated by a clock oscillation unit so as to bring the phase error information close to zero. Since the over sampling clock is used, the delay time in the PLL is reduced, and thereby the marginal playback performance is enhanced against tilt, noise, asymmetry, defect, or the like. Furthermore, since the channel bit clock is supplied to a portion where the over sampling clock is not needed, the circuit scale and power consumption are reduced.

According to a fourth aspect of the present invention, in the playback signal processing apparatus according to the third aspect, the phase determination unit comprises: an edge generation unit for generating a signal that is required for detecting either a rising edge or a falling edge of the channel bit clock; a reference flag generation unit for generating a reference flag for a signal that is outputted from the edge generation unit at a timing synchronized with the over sampling clock; and a reference flag delay unit for delaying the reference flag by an arbitrary number of over sampling clocks to generate a phase reference signal used for uniquely determining the relationship in phases between the channel bit clock and the over sampling clock. Therefore, the relationship between the over sampling clock and the channel bit clock is uniquely determined, whereby the construction of the apparatus is simplified, and the phase-locked pull-in control is stabilized.

According to a fifth aspect of the present invention, in the playback signal processing apparatus according to the third aspect, the over sampling phase control unit comprises: a plurality of playback signal delay units for delaying and holding an output signal of the analog-to-digital conversion unit, at every clock, at a timing synchronized with the over sampling clock; a plurality of playback signal holding units for holding the output signals of the plural playback signal delay units, at a timing of a phase reference signal generated by the phase determination unit; a polarity inversion detection unit for judging whether the polarities of predetermined two output signals among the output signals of the plural playback signal delay units are inverted or not; and a polarity inversion information holding unit for holding an output signal of the polarity inversion detection unit at the timing of the phase reference signal. Therefore, the time required for detecting the phase error information is reduced, whereby the delay time in the PLL is reduced.

According to a sixth aspect of the present invention, in the playback signal processing apparatus according to the fifth aspect, the plurality of playback signal delay units include: a playback signal delay unit A for outputting a playback signal which is positioned in a phase that is apart by a predetermined amount of phase from the reference phase of the channel bit clock whose cycle is expressed by $2\pi$ ($\pi$=ratio of the circumference of a circle to its diameter), a playback signal delay unit C for outputting a playback signal which is positioned in a phase that is apart by $2\pi$ from the playback signal delay unit A, and a playback signal delay unit B for outputting a playback signal that is positioned in a phase apart by $\pi$ from the playback signal delay unit A, which unit B is located midway between the playback signal delay unit A and the playback signal delay unit C; the plurality of playback signal holding units have playback signal holding units A, B, and C for holding the output signals from the playback signal delay units A, B, and C at the timing of the phase reference signal, respectively; the polarity inversion detection unit judges whether the polarities are inverted or not, on the basis of the output signals of the playback signal delay units A and C among the plural playback signal delay units; and the playback signal holding unit B outputs a basic signal for detecting phase error information from the output of the over sampling phase control unit. Therefore, the polarity inversion information and the phase error information can be directly detected without being interpolated, while either the polarity inversion information or the phase error information must be interpolated in the conventional apparatus, whereby the accuracy of the phase error information is improved, leading to enhanced playback performance, which is particularly effective against asymmetry.

According to a seventh aspect of the present invention, in the playback signal processing apparatus according to the sixth aspect, among the plurality of playback signal delay units, the playback signal delay unit A outputs a playback signal corresponding to a phase of zero of the channel bit clock whose cycle is expressed by $2\pi$ ($\pi$=ratio of the circumference of a circle to its diameter); the playback signal delay unit C outputs a playback signal corresponding to a phase of $2\pi$ of the channel bit clock; and the playback signal delay unit B outputs a playback signal corresponding to a phase of $\pi$ of the channel bit clock. Therefore, a waste of time is avoided when processing the phase error information using the channel bit clock, thereby realizing an optimum PLL with respect to performance and cost.

According to an eighth aspect of the present invention, in the playback signal processing apparatus according to the third aspect, the phase synchronization control unit comprises: a zerocross position detection unit for detecting zerocross position information of the output signal of the over sampling phase control unit, a phase error information detection unit for detecting phase error information between the zerocross position information and the output signal of the over sampling phase control unit, and a loop filter for smoothing the phase error information; and the phase synchronization control unit operates in synchronization with the cycle of the over sampling clock. Therefore, the time required for generating the phase control signal is reduced, whereby the delay time in the PLL is reduced.

According to a ninth aspect of the present invention, in the playback signal processing apparatus according to the eighth aspect, the phase error information detection unit controls the polarity of the output signal of the playback signal holding unit B among the plurality of playback signal holding units, thereby to generate phase error information, when the polarity inversion detection unit defined in Claim 6 judges that the polarities of the output signals of the playback signal delay units A and C are inverted, and either the rising edge or falling edge of the optical playback waveform is detected. Therefore, the number of times the phase error information is detected is increased to improve the detection accuracy, whereby the marginal playback performance is enhanced.

According to a tenth aspect of the present invention, the playback signal processing apparatus according to the second aspect further includes a digital data demodulation unit comprising a first demodulation unit for demodulating the first digital data, and a second demodulation unit for demodulating the second digital data or the third digital data. Therefore, the loop delay time in the PLL is reduced, and thereby the marginal playback performance is enhanced. Further, demodulated digital data according to different demodulation modes can be simultaneously obtained from the first and second demodulation units, respectively. Moreover, since the jitter component of the playback waveform is detected from the first, second, and third digital data in which information in the time direction is increased, the jitter detection accuracy is improved.

According to an eleventh aspect of the present invention, in the playback signal processing apparatus according to the first or tenth aspect, the digital data demodulation unit includes, as the first demodulation unit, a PRML (Partial Response Maximum Likelihood) signal processing unit for estimating a most likely data string by utilizing an interference between codes which is intentionally added to the output signal of the operation cycle conversion unit, and includes, as the second demodulation unit, a level judgement binarization unit for demodulating digital data by binarizing the output signal of the operation cycle conversion unit on the basis of a center level of the output signal at which code balance is kept; and both of the PRML signal processing unit and the level judgement binarization unit are operated in synchronization with the channel bit clock. Therefore, it is possible to simultaneously obtain the demodulated signal according to the PRML signal processing method that is effective to linear-direction high-density recording/playback, and the demodulated signal according to the level judgement method that is stable against burst errors caused by defects or the like, resulting in improved quality of demodulated data as well as enhanced playback performance.

According to a twelfth aspect of the present invention, in the playback signal processing apparatus according to the eleventh aspect, the PRML signal processing unit demodulates data of a signal that is obtained by converting the operation cycle of the output signal of the playback signal holding unit B according to the sixth aspect, by using the operation cycle conversion unit. Therefore, it is possible to make the demodulated signal according to the PRML signal processing method significant by converting the over sampling frequency back into a frequency equal to the original channel bit frequency. Further, the PRML signal processing can be continuously used independently of the type, speed, and playback mode of the optical disc.

According to a thirteenth aspect of the present invention, in the playback signal processing apparatus according to the eleventh aspect, the level judgement binarization unit demodulates data of a pre-binarization signal that is obtained by converting either the operation cycle of the output signal from the playback signal holding unit A or the operation cycle of the output signal from the playback signal holding unit C, the units A and C being defined in Claim 6, by using the operation cycle conversion unit. Therefore, it is possible to make the demodulated signal according to the PRML signal processing method significant by converting the over sampling frequency back into a frequency equal to the original channel bit frequency. Further, while in the conventional apparatus accurate demodulated data cannot be obtained by the level judgement binarization unit when the PRML signal processing unit is selected as the demodulation unit, the two demodulation units can be simultaneously operated at the maximum accuracy in the present invention. Therefore, playback can be carried out using a single control method independently of the type, speed, and playback mode of the optical disc, resulting in simplified construction of the apparatus.

According to a fourteenth aspect of the present invention, in the playback signal processing apparatus according to the first or tenth aspect, the digital data demodulation unit further includes a demodulation data switching unit and a selection unit; and the selection unit selects either the output signal of the first demodulation unit or the output signal of the second demodulation unit using a selection signal from the demodulation, and outputting the selected signal as demodulated data. Therefore, it is possible to automatically select one of the demodulated signal from the first demodulation unit and the demodulated signal from the second demodulation unit, according to the selection signal generated by the demodulated data switching unit.

According to a fifteenth aspect of the present invention, in the playback signal processing apparatus according to the third aspect, the over sampling phase synchronization unit further includes an offset correction unit for reducing an offset component in the amplitude direction from the multiple-bit discrete signal, and outputting the signal to the over sampling phase control unit. Therefore, it is possible to reduce the offset component in the amplitude direction, which is included in the multiple-bit discrete signal.

According to a sixteenth aspect of the present invention, in the playback signal processing apparatus according to the fifteenth aspect, the offset correction unit comprises: an offset level detection unit for detecting offset level information in the amplitude direction from the output signal of the over sampling phase control unit; an offset level smoothing unit for smoothing the offset level information in the amplitude direction; and an offset level subtraction unit for subtracting the output signal of the offset level smoothing unit from the multiple-bit discrete signal to reduce the offset component. Therefore, the delay time in the offset correction control loop is reduced as compared with that in the conventional apparatus, and thereby the offset correction performance is enhanced, resulting in enhanced playback performance when the optical playback waveform has a large fluctuation in the offset level in the amplitude direction due to defects or the like.

According to a seventeenth aspect of the present invention, in the playback signal processing apparatus according to the sixteenth aspect, the offset level detection unit comprises: a center level fluctuation information detection unit for detecting fluctuation in the center level of the playback signal, from the output signal of the playback signal holding unit B among the plurality of playback signal holding units, and the output signal of the polarity inversion detection unit, the holding unit B and the detection unit being according to the sixth aspect; a polarity balance calculation unit for detecting polarity balance information by accumulating polarity information from the output signal corresponding to one cycle of the channel bit clock, among the output signals of the plurality of playback signal holding units; and an offset information mixing unit for adding the center level fluctuation information and the polarity balance information at a predetermined ratio to detect an offset level. Therefore, the amount of information in the time direction is increased as compared with that in the conventional apparatus, and thereby the accuracy of detecting the offset level information in the amplitude direction is increased, resulting in enhanced offset correction performance.

According to an eighteenth aspect of the present invention, in the playback signal processing unit according to the second aspect, the jitter detection unit comprises: a jitter element detection unit for detecting an absolute value component in the amplitude direction at a zerocross point, from the output signal of the playback signal holding unit B among the plurality of playback signal holding units, and the output signal of the polarity inversion detection unit, the holding unit B and the detection unit being according to the sixth aspect; a jitter reference cycle detection unit for calculating a distance in the amplitude direction from the output signals of the playback signal holding units A and C among the plurality of playback signal holding units; and an absolute jitter component detection unit for detecting a jitter component by subtracting the output signal of the jitter element detection unit by the output signal of the jitter reference cycle detection unit. Therefore, while in the conventional apparatus accurate detection of jitter component cannot be carried out because the information required for detecting jitter component must be generated by interpolation, the accuracy of detecting jitter component is improved in the present invention because the required information can be directly detected. Accordingly, the accuracy of learning the servo signal processing is enhanced, resulting in stable quality of the playback waveform.

According to a nineteenth aspect of the present invention, an optical disc device comprises: a spindle motor for rotating an optical disc; an optical pickup for reading a playback signal from the optical disc; a playback signal processing apparatus according to any of the first to eighteenth aspects, for processing the playback signal that is read by the optical pickup; a decoding circuit for demodulating the signal processed by the playback signal processing apparatus, and subjecting the demodulated signal to error processing; a servo control circuit for controlling the spindle motor and the optical pickup; and a system controller for carrying out data communication with external devices, and controlling the respective function blocks. Therefore, when demodulating the digital data recorded on the optical disc, the delay time in the PLL is reduced by employing the over sampling clock having a frequency N times (N: a multiple of 2) as high as the frequency of the channel bit clock, and thereby the marginal playback performance is enhanced. Further, the quality of the demodulated data is improved as compared with that in the conventional apparatus by applying the PRML signal processing method which is advantageous to linear-direction high-density recording/playback. Moreover, when burst errors occur frequently due to defects or the like, another binary output signal can be selected to enhance the versatility. Further, since the information in the time direction is increased, the jitter detection accuracy is improved, whereby learning of focus servo or waveform equalization can be optimized.

DETAILED DESCRIPTION OF THE PREFERRED EMBODIMENTS

Embodiment 1

According to a first embodiment of the present invention, there is provided a playback signal processing apparatus for, when playing an optical disc, synchronizing a channel bit signal and a channel bit clock by using a PLL to obtain a playback signal from a channel, and decoding the playback signal by a Viterbi decoder of a PRML signal processing means to obtain a binary output. In this apparatus, a phase error can be detected in a short time by using, as a playback clock, an over sampling clock synchronized with the channel bit signal, whereby phase-locked pull-in performance of the PLL can be improved. Further, two kinds of binary outputs, i.e., a binary output from the PRML signal processing means and a binary output that is obtained by performing level judgement on the output of a phase comparator as a component of the PLL, can be simultaneously obtained all the time without changing the sampling method.

Hereinafter, a description will be given of a playback signal processing apparatus according to the first embodiment, and an over sampling type optical recording/playback apparatus as an optical apparatus having the playback signal processing apparatus, with reference to FIGS. 1 through 16.

The playback signal processing apparatus corresponds to Claims 1 to 18, and the over sampling type optical recording/playback apparatus corresponds to Claim 19. These apparatuses can realize both of PRML (Partial Response Maximum Likelihood) signal processing that is advantageous in enhancing the performance of the PLL (Phase-Locked Loop) as well as in linear-direction high-density recording/playback, and level judgement processing that is advantageous in the case where defects or the like occur, simultaneously, with high accuracy.

Figure 1:
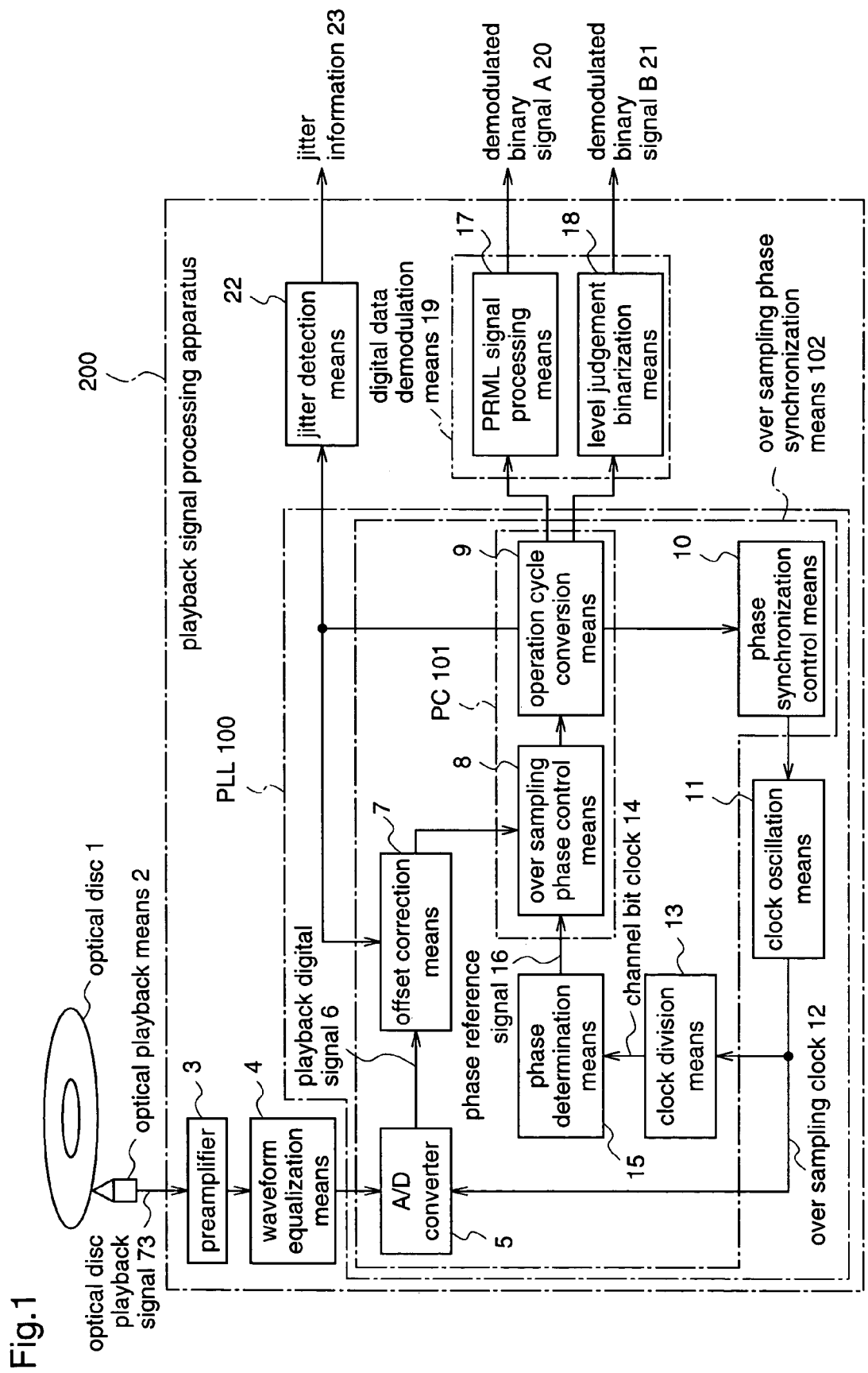
FIG. 1 is a block diagram illustrating the construction of a playback signal processing apparatus according to a first embodiment of the present invention.

FIG. 1 is a block diagram illustrating a playback signal processing apparatus 200 according to the first embodiment, comprising a preamplifier 3, a waveform equalization means 4, an analog-to-digital converter (analog-to-digital conversion unit) 5, an offset correction means 7, an over sampling phase control means 8, an operation frequency conversion means 9, a phase synchronization control means 10, a clock oscillation means 11, a clock division means 13, a phase decision means 15, a PRML signal processing means 17, a level judgement binarization means 18, and a jitter detection means 22.

The PRML signal processing means (first demodulation unit) 17 and the level judgement binarization means (second demodulation unit) 18 constitute a digital data demodulation means 19, and a part of the playback signal processing apparatus 200 excluding the preamplifier 3, the waveform equalization means 4, the digital data demodulation means 19, and the jitter detection means 22 constitutes a PLL 100. Further, a part of the PLL 100 excluding the clock oscillation means 11 constitutes an over sampling phase synchronization means 102. The over sampling phase control means 8 and the operation frequency conversion means 9 included in the over sampling phase synchronization means 102 constitutes a phase comparator 101.

Figure 2:
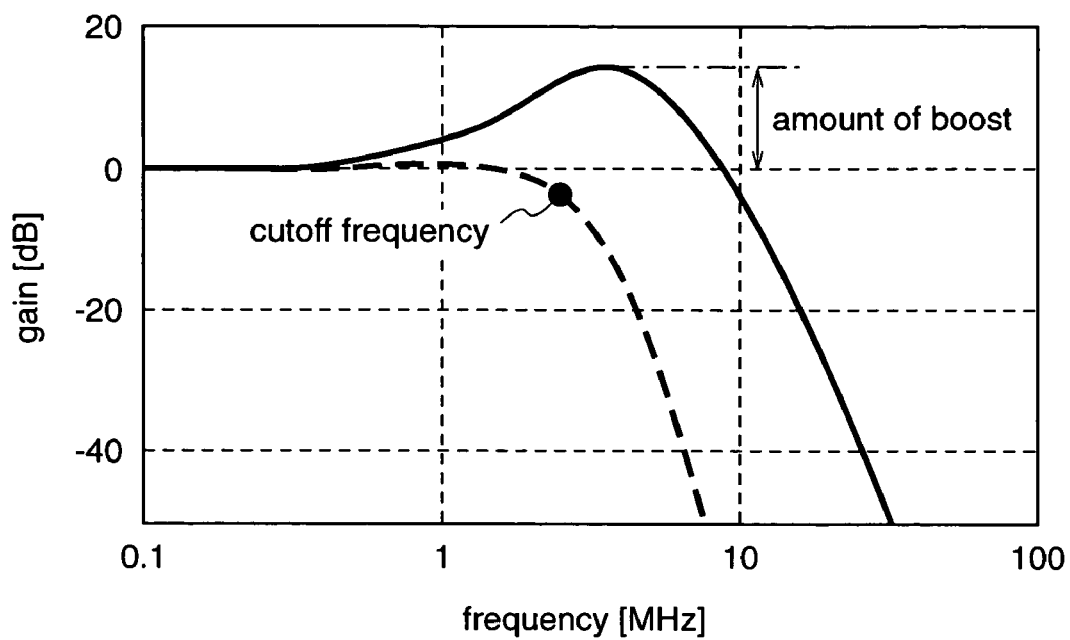
FIG. 2 is a diagram for explaining frequency characteristics of a higher-order equalization ripple filter.

In FIG. 1, an optical disc playback signal 73 is generated from an optical disc (information storage medium) 1 using an optical playback means (information playback unit) 2 such as an optical pickup. An attenuation in the amplitude of the optical disc playback signal 73 generated by the optical playback means 2 becomes more remarkable in high-frequency component as the recording density in the linear direction becomes higher according to the patterns of adjacent recorded codes, leading to degradation in jitter component possessed by the optical disc playback signal. In order to solve this problem, the optical disc playback signal 73 inputted to the playback signal processing apparatus 200 is emphasized in output amplitude by the preamplifier 3 and, thereafter, subjected to correction for emphasizing the high-frequency component by the waveform equalization means 4, whereby the amplitude of the high-frequency component of the optical disc playback signal is increased to improve the jitter. The waveform equalization means 4 is constituted by a filter that can arbitrarily set an amount of boost and a cut-off frequency. This filter may be a high-order ripple filter having frequency characteristics shown by a solid line in FIG. 2. In FIG. 2, a dotted line shows the frequency characteristics of the waveform equalization means 4 in the case where the high-frequency component is not boosted.

Next, the output signal of the waveform equalization means 4 is converted into a multiple-bit digital signal (a multiple-bit discrete signal, hereinafter referred to as a playback digital signal) by an A/D converter 5 for converting an analog signal into a digital signal with the over sampling clock 12 as a timing reference. The over sampling clock 12 is generated by the clock oscillation means 11. That is, the over sampling clock 12 is generated on the basis of the playback digital signal 6, as a clock which is synchronized with a frequency N times (N: over sampling ratio, a multiple of 2) as high as the frequency of the channel bit clock that is obtained when reproducing a signal corresponding to one channel bit of the digital data written in the optical disc.

The clock oscillation means 11 is supplied with, for example, a multiple-bit digital signal as a signal for controlling its oscillation frequency, and the clock oscillation means 11 may be provided with a digital-to-analog (D/A) converter for converting the control digital signal into a voltage, and a VCO (Voltage Controlled Oscillator) that can vary the oscillation frequency by using the D/A converted voltage value. Further, in order to generate a clock synchronized with the bit rate of the codes recorded on the optical disc 1, the clock division means 13 reduces the frequency of the over sampling clock 12 to 1/N, thereby generating a channel bit clock 14.

Hereinafter, a case where the over sampling ratio N is equal to 4 will be described as an example.

When the over sampling ratio N is 4, the playback digital signal 6 converted by the A/D converter 5 has quadruple sampling signals in the phase direction with respect to one channel bit of the recorded digital data. Therefore, it is necessary to uniquely decide as to which phase of sampling signal in the playback digital signal 6 is required for digital data demodulation. So, the phase decision means 15 generates a phase reference signal 16 for uniquely deciding the phase relationship between the channel bit clock 14 and the over sampling clock 12.

Figure 3:
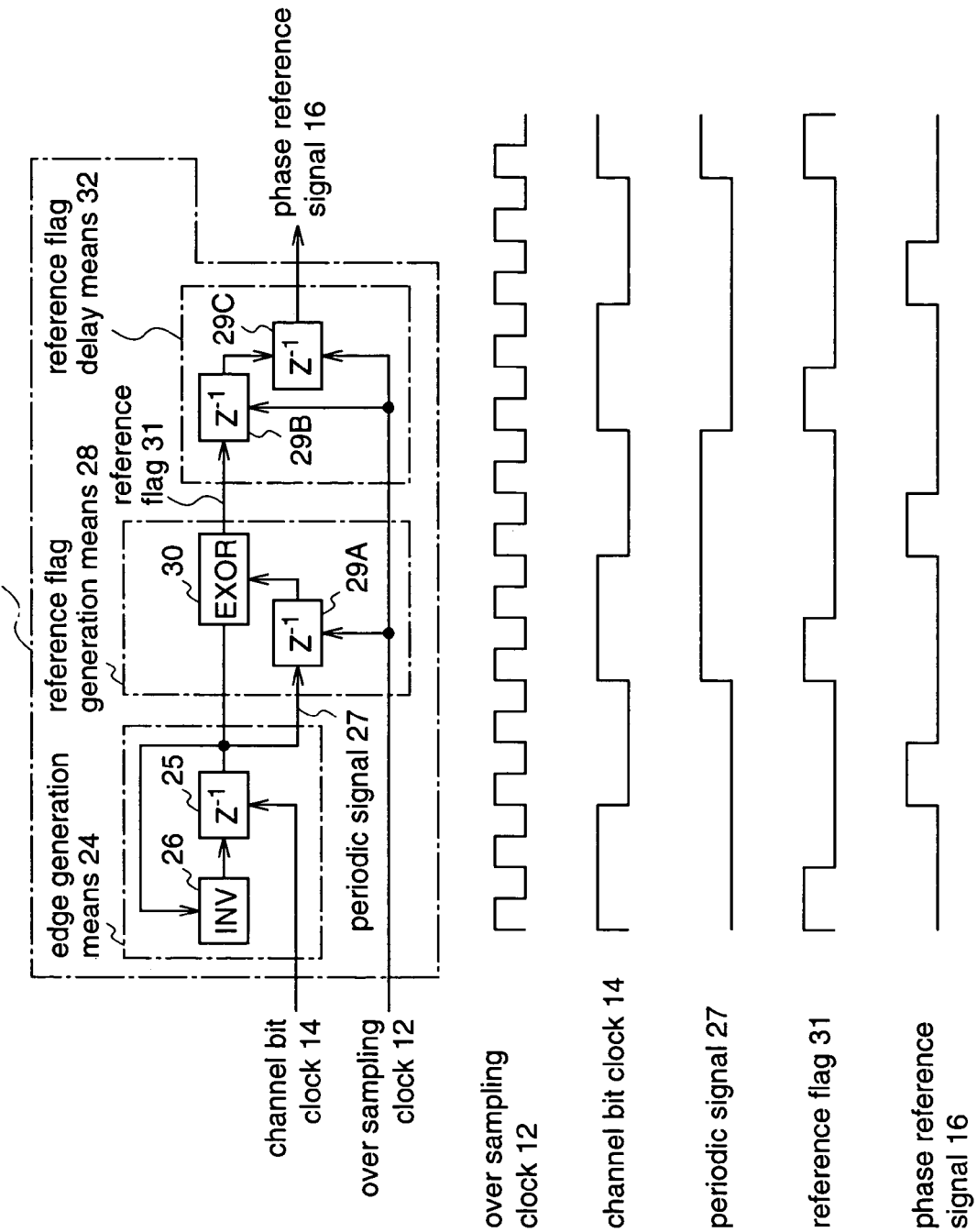
FIG. 3 is a diagram illustrating a block diagram of a phase determination means according to the first embodiment, and timing charts of signals at the respective parts of the phase determination means.

FIG. 3 shows the construction of the phase decision means 15 for generating the phase reference signal 16. The phase decision means 15 comprises an edge generation means 24, a reference flag generation means 28, and a reference flag delay means 32. The circuit construction shown in FIG. 3 is merely a fundamental example, and this circuit construction may be applied to generate the phase reference signal 16.

First of all, the edge generation means 24 comprises a shift register B 25 ($Z^{-1}$ in FIG. 3) for delaying an input signal by one clock in synchronization with the channel bit clock 14, and an inverter 26 (INV in FIG. 3) for inverting the output signal of the shift register B 25 to input the inverted signal to the shift register B 25 as a clock. The edge generation means 24 generates a periodic signal 27 by the shift register B 25 and the inverter 26. The periodic signal 27 is obtained by reducing the frequency of the channel bit clock to ½.

Next, the reference flag generation means 28 comprises a shift register A 29A for delaying the periodic signal 27 by one clock in synchronization with the over sampling clock 12, and an exclusive OR circuit (EXOR in FIG. 3) 30 for comparing the output signal of the shift register A 29A with the periodic signal 27, and outputting "0" when these signals match while outputting "1" when these signals do not match. The reference flag generation means 28 generates a reference flag 31 by the shift register A 29A and the exclusive OR circuit 30. The reference flag 31 is input to the reference flag delay means 32, and delayed by two stages of shift registers A 29B and A 29C, whereby a phase reference signal 16 is output at a timing which minimizes the data migration time between the over sampling clock 12 and the channel bit clock 14.

Next, the playback digital signal 6 that has been sampled using the over sampling clock 12 is input to the offset correction means 7, thereby obtaining the center of the waveform of the playback digital signal 6, and correcting the offset component in the amplitude direction, which is included in the playback digital signal 6. The specific operation of the offset correction means 7 will be described later.

On the other hand, in order to realize demodulation of digital data, it is necessary to generate, from the playback digital signal 6, an over sampling clock 12 that is synchronized with the phase of the frequency of the clock component included in the playback digital signal 6, and a channel bit clock 14. For this purpose, it is necessary to accurately extract the phase error information from the output signal of the offset correction means 7, convert the phase error information into a phase control signal by filtering such as smoothing, and constitute a PLL (Phase Locked Loop) 100 that controls the clock oscillation means 11 so that the phase error information approaches zero.

The PLL 100 is a circuit for bringing the channel bit clock of the digital signal recorded on the optical disc 1 into synchronization with the over sampling clock having a frequency four times as high as that of the channel bit clock. The PLL 100 has a main control loop comprising the A/D converter 5→the offset correction means 7→the over sampling phase control means 8→the operation frequency conversion means 9→the phase synchronization control means 10→the clock oscillation means 11→the A/D converter 5, and a sub control loop comprising the over sampling phase control means 8→the operation frequency conversion means 9→the phase synchronization control means 10→the clock oscillation means 11→the clock division means 13→the phase determination means 15→the over sampling phase control means 8. The phase synchronization control means 10 includes a low-pass filter (smoothing filter).

Initially, the over sampling phase control means 8 in the PLL 100 detects, from the output signal of the offset correction means 7, zerocross position information indicating polarity change positions which are "A0" and "B0", and "D0" and "E0" among sampling signals "○", and reference information for extracting phase error information corresponding to "A2" and "D2" among the sampling signals "●", at a timing synchronized with the over sampling clock 12, and thereafter, these information are held like playback signal holding outputs A, B, and C at a timing of the phase reference signal 16.

Since the over sampling clock is useless when operating the PRML signal processing means 17, the level judgement binarization means 18, and the phase synchronization control means 10, the signal stored in the over sampling phase control means 8 is converted from a signal synchronized with the over sampling clock into a signal synchronized with the channel bit clock 14, by the operation frequency conversion means 9. This conversion corresponds to 4 frequency division. The phase error information is extracted by the phase synchronization control means 10 on the basis of the converted signal or the output signal of the over sampling phase control means 8, and thereafter, the phase error signal is subjected to filtering, thereby generating a phase control signal for controlling the clock oscillation means 11. The over sampling clock 12 synchronized with the playback digital signal 6 is supplied from the clock oscillation means 11 to the A/D converter 5 on the basis of the phase control signal, thereby constituting the PLL 100 that enables phase-locked pull-in.

Figure 5:
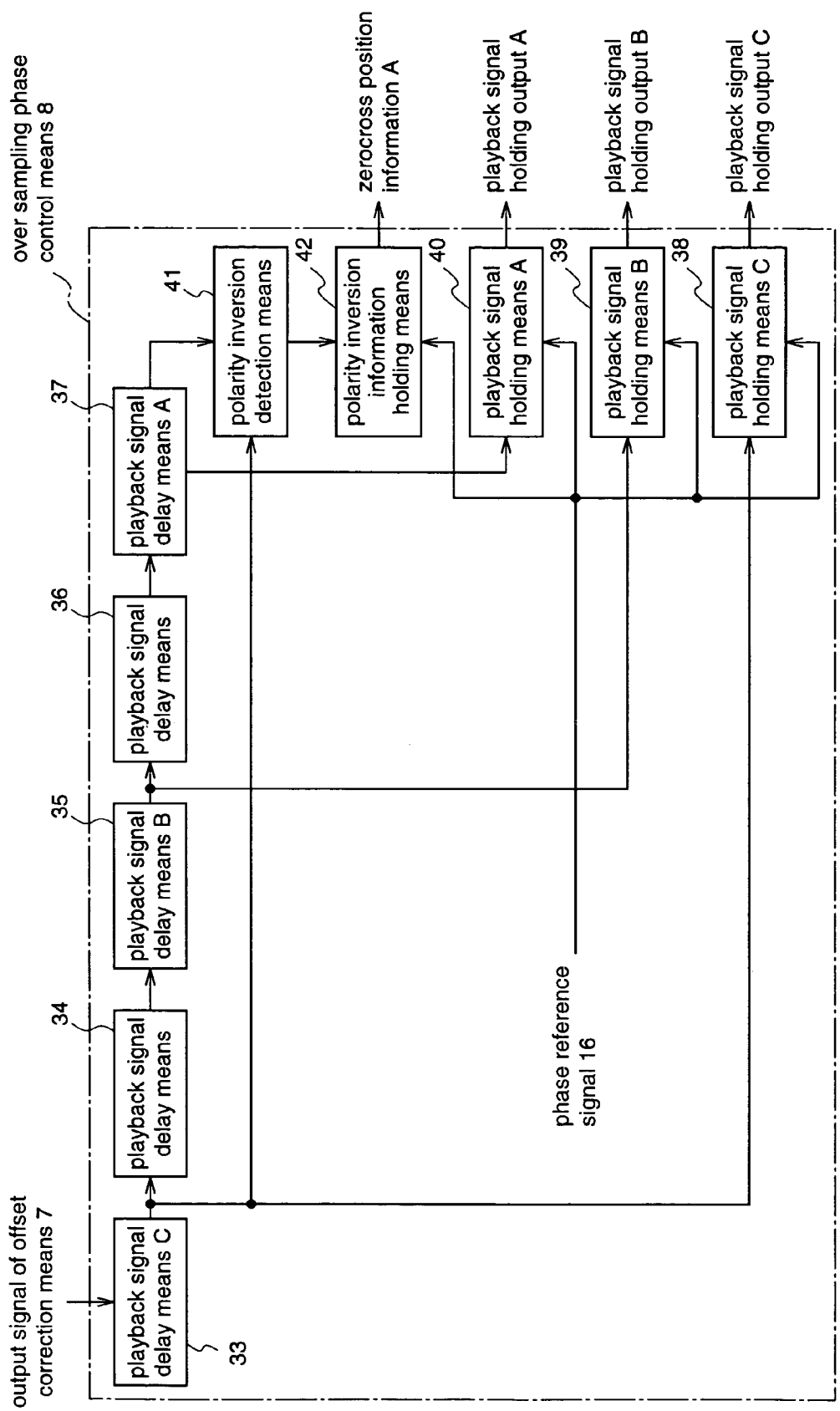
FIG. 5 is a block diagram illustrating the construction of the over sampling phase control means according to the first embodiment.

FIG. 5 shows the construction of the over sampling phase control means 8. The circuit construction shown in FIG. 5 is merely an example, and this circuit construction may be applied to implement an apparatus.

Figure 4:
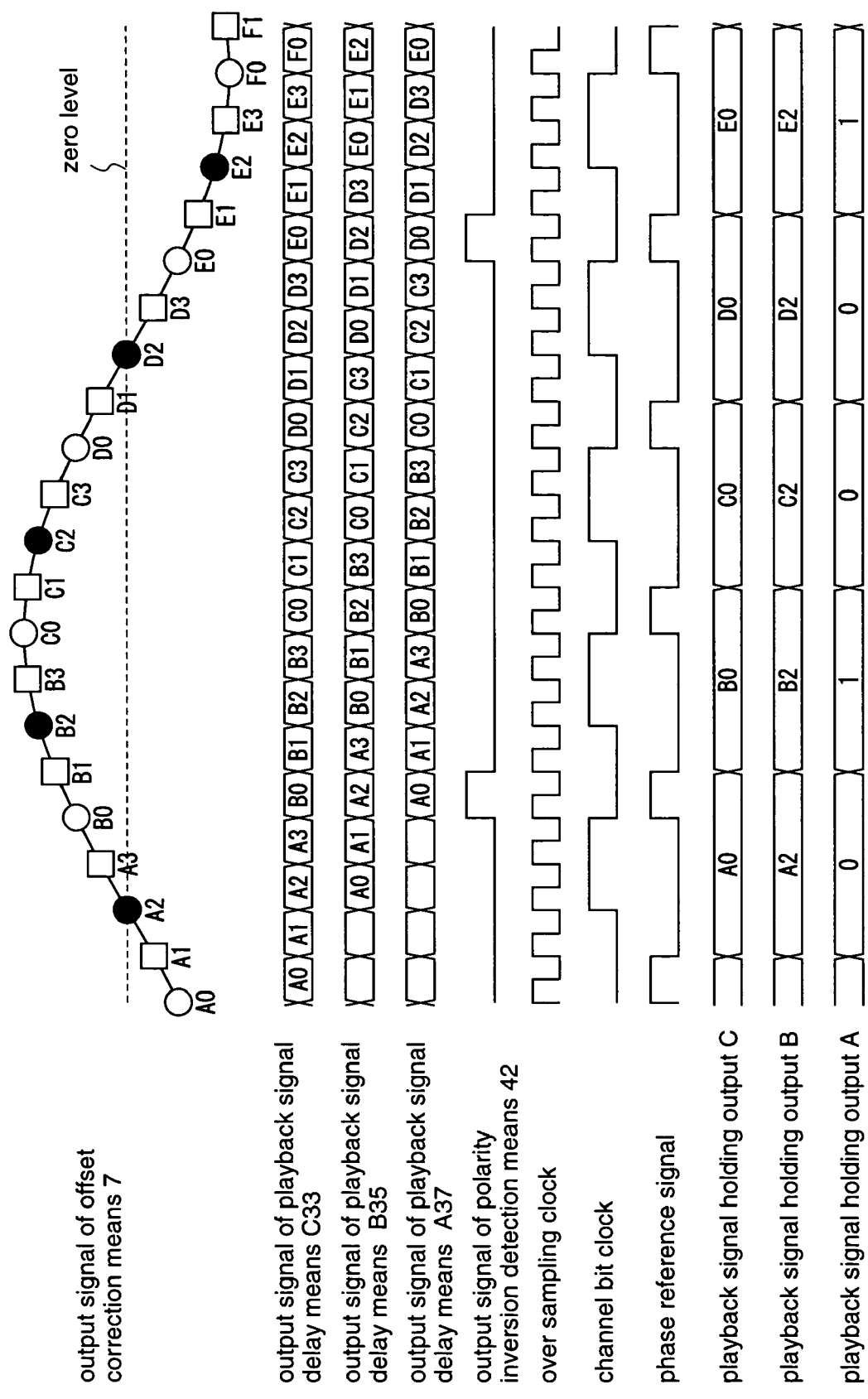
FIG. 4 is a diagram illustrating the operation principle of an over sampling phase control means according to the first embodiment, and timing charts of signals at the respective parts of the over sampling phase control means.

In the over sampling phase control means 8, the output signal of the offset correction means 7 is successively delayed clock by clock, using delay means 33 to 37 which are connected in series in order of a playback signal delay means C33, a playback signal delay means 34, a playback signal delay means B35, a playback signal delay means 36, and a playback signal delay means A37, at a timing synchronized with the over sampling clock 12. The signals at the playback signal delay means C33, the playback signal delay means B35, and the playback signal delay means A37 are represented as various delay signals of the output signal from the offset correction means 7 as shown in FIG. 4.

Then, the output signal of the playback signal delay means C33 is stored in the playback signal holding means C38 at a timing of the phase reference signal 16 outputted from the phase determination means 15, thereby generating a playback signal holding output C. Likewise, the output signal of the playback signal delay means B35 is stored in the playback signal holding means B39 to generate a playback signal holding output B, and the output signal of the playback signal delay means A37 is stored in the playback signal holding means A40 to generate a playback signal holding output A. The playback signal holding output C, the playback signal holding output B, and the playback signal holding output A are signals that change at the same frequency as the channel bit clock 14 as shown in FIG. 4. The playback signal holding output C holds the sampling signals "○" whose phases are "0", i.e., "A0", "B0", "C0", "D0", and "E0", the playback signal holding output B holds the sampling signals "●" whose phases are "π", i.e., "A2", "B2", "C2" , "D2" , and "E2", and the playback signal holding output A holds the signal that is delayed by one channel bit clock from the playback signal holding output C. Further, "□" indicates signals whose phases are positioned at "π/2" and "3π/2".

When demodulating digital data, the playback signal holding outputs A and C are suited to the level judgement method in which binary judgement is carried out at an arbitrary level, which is advantageous to the case where there are defects or the like that may cause burst errors, while the playback signal holding output B is suited to the PRML signal processing method which is advantageous to linear-direction high-density recording/playback. Moreover, since, by performing over sampling, the playback signal holding output A and the playback signal holding output B are obtained as signals that are sampled by the same over sampling clock, the binary signal according to the PRML signal processing method and the binary signal according to the level judgement method can be simultaneously obtained without changing the sampling mode.

Next, a polarity inversion detection means 41 compares the polarity signal of the output of the playback signal delay means A37 with the polarity signal of the output of the playback signal delay means C33, and outputs a flag indicating a zerocross position. When these polarities are different from each other, a flag indicating a zerocross position is output. This flag detects a polarity inversion between "A0" and "B0", and a polarity inversion between "D0" and "E0". There are other methods of detecting a polarity inversion, such as "A1" and "A3" or "D1" and "D3", and an appropriate detection method may be selected considering resistance to noise characteristics or asymmetry characteristics. This flag is held by the polarity inversion information holding means 42 at a timing of the phase reference signal 16, thereby generating zerocross position information A. The zerocross position information A is a signal that changes at the same intervals as the channel bit clock 14.

In the case where the quadruple over sampling system is employed, the playback signal holding output A and the playback holding output C are apart from each other by 2π (π=ratio of the circumference of a circle to its diameter) that is one cycle of the channel bit clock 14. The playback signal holding output B reflects a playback signal positioned in the center that is apart by phase π from each of the playback signal holding output A and the playback signal holding output C, and the playback signal holding output B serves as a reference signal when detecting the phase error information. This construction makes it possible to extract the phase error information in short time, at maximum accuracy, without damaging the information of the playback digital signal 6.

Figure 6:
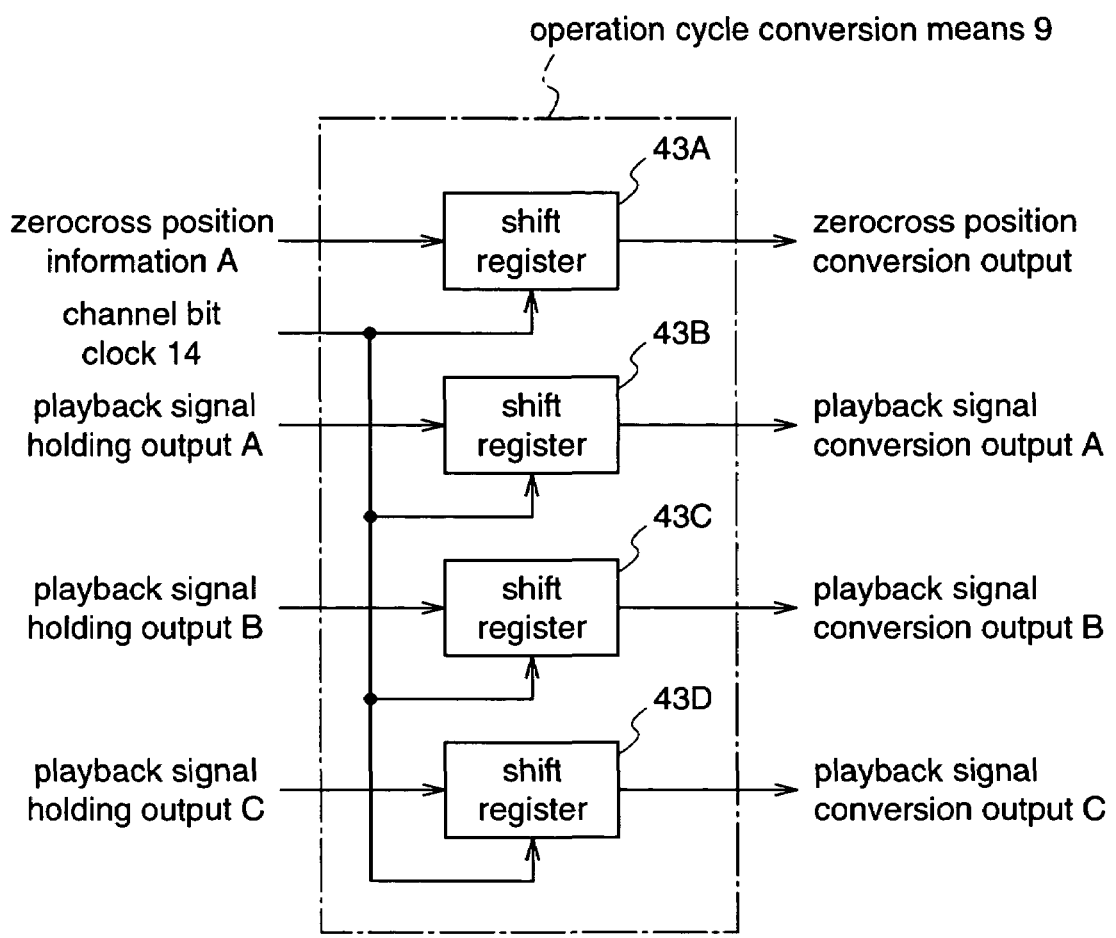
FIG. 6 is a block diagram illustrating the construction of an operation cycle conversion means according to the first embodiment.

FIG. 6 is a block diagram illustrating the construction of the operation cycle conversion means 9. The operation cycle conversion means 9 returns the over-sampled frequency to a frequency equal to the original channel bit frequency. The reason is as follows. In the PRML signal processing means 17 and the level judgement binarization means 18 which are subsequent to the operation frequency conversion means 9, filtering and binary judgement must be carried out using the original channel bit frequency. The circuit construction shown in FIG. 6 is merely an example, and the circuit construction may be applied to realize an apparatus.

In the operation cycle conversion means 9, a shift register 43A for converting the input signal into a signal that operates at a timing synchronized with the channel bit clock 14, converts the zerocross position information A as an output signal of the over sampling phase control means 8 shown in FIG. 5 into a zerocross position conversion output. That is, the shift register 43A outputs the input to the shift register 43A (zerocross position information A) as an output signal (zerocross position conversion output) every time the rising edge of the channel bit clock 14 is input, and holds the output signal until the next rising edge of the channel bit clock 14 is input, thereby to obtain the zerocross position conversion output synchronized with the channel bit clock 14. Likewise, a shift register 43B converts the playback signal holding output A into a playback signal conversion output A (second digital data), a shift register 43C converts the playback signal holding output B into a playback signal conversion output B (first digital data), and a shift register 43D converts the playback signal holding output C into a playback signal conversion output C (third digital data). The PRML signal processing means 17 demodulates the playback signal conversion output B, and the level judgement binarization means 18 demodulates the playback signal conversion output A or the playback signal conversion output C.

Application of the constructions shown in FIGS. 3 to 6 avoids a waste of time when converting the signal that changes in synchronization with the over sampling clock 12 into the signal that changes in synchronization with the channel bit clock 14. Further, since the over sampling clock is supplied to the position that requires the over sampling clock, an increase in the circuit scale with an increase in the circuit velocity can be minimized, resulting in a system of the highest conversion efficiency. Further, since the phase synchronization control means 10 operates in synchronization with the channel bit clock, the constructions of the internal smoothing filter and the next-stage clock oscillation means are simplified.

Figure 7:
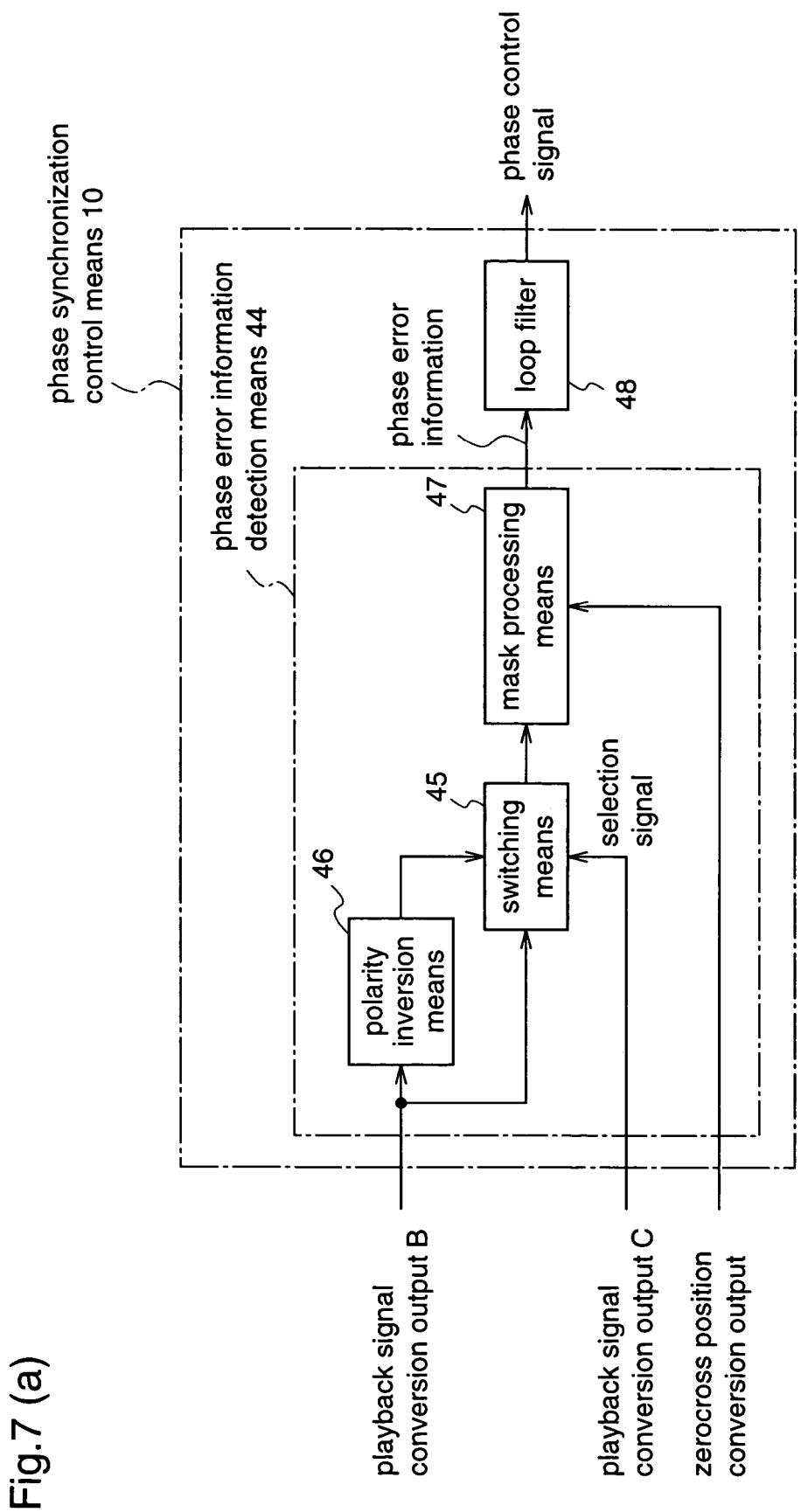
FIG. 7(a) is a block diagram illustrating the construction of a phase synchronization control means according to the first embodiment.
FIG. 7(b) is a diagram illustrating the principle of detecting phase error information.
Figure 7:
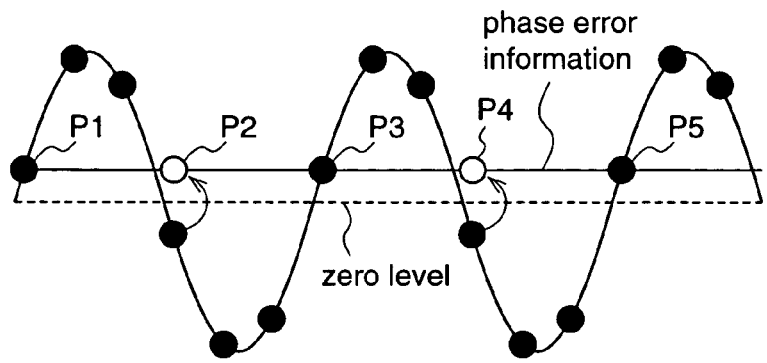

FIG. 7(a) is a block diagram illustrating the construction of the phase synchronization control means 10. The circuit construction shown in FIG. 7 is merely an example, and this circuit construction may be applied to implement an apparatus.

The phase synchronization control means 10 operates at a timing synchronized with the channel bit clock 14. The phase synchronization control means 10 includes a phase error information detection means 44 having a switching means 45.

The switching means 45 selects a signal outputted from a polarity inversion means 46 for inverting the polarity of the playback signal conversion output B when the polarity of the playback signal conversion output C outputted from the operation cycle conversion means 9 shown in FIG. 6 is "positive", and selects the playback signal conversion output B as it is when the polarity of the playback signal conversion output C is "negative". The playback signal conversion output B is shown by "●" in FIG. 7(b).

The phase error information detection means 44 further includes a mask processing means 47. The mask processing means 47 outputs the output signal of the switching means 45 as phase error information only when it is judged that the zerocross position, i.e., the polarity, is inverted on the basis of the zerocross position conversion output, and the zerocross position corresponds to either the rising edge or the falling edge of the optical playback waveform. The phase error information thus obtained is shown by "P1", "P2", "P3", "P4", and "P5" in FIG. 7(b). The switching means 45 selects the output signal of the polarity inversion means 46 at "P2" and "P4" corresponding to the falling edge.

The phase synchronization control means 10 subjects the phase error information thus detected to filtering using the loop filter 48, thereby generating a phase control signal.

Figure 8:
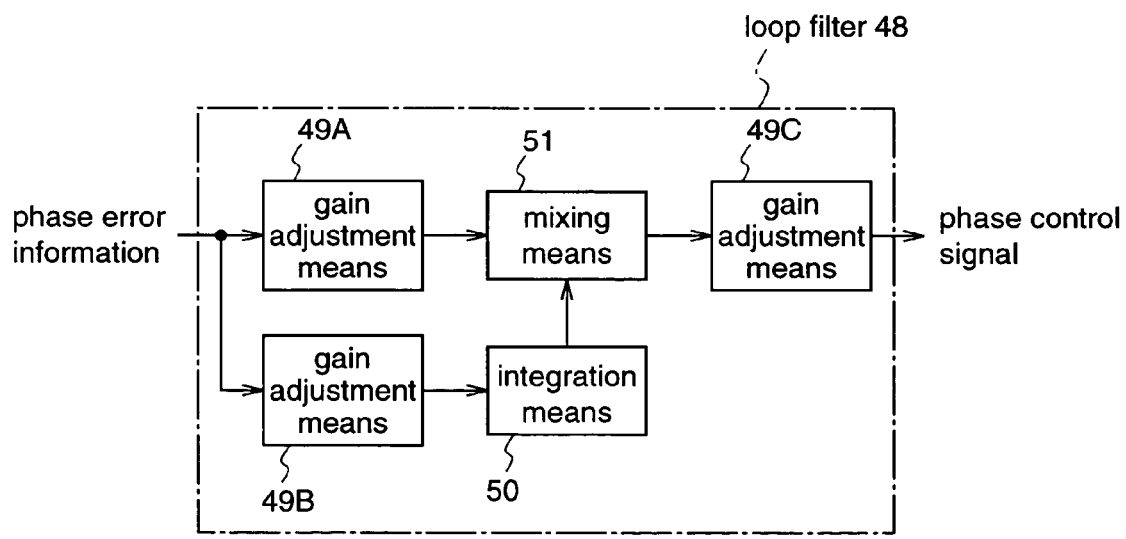
FIG. 8 is a block diagram illustrating the construction of a loop filter according to the first embodiment.

The loop filter 48 may be an active filter as shown in FIG. 8. In the loop filter 48, the phase error information is input to a gain adjustment means 49A and a gain adjustment means 49B to control the gains at the proportional term side and the integral term side, respectively. Thereafter, the output signal of the gain adjustment means 49B is input to an integration means 50 to perform integration. The output signals of the integration means 50 and the gain adjustment means 49A are added by a mixing means 51. Finally, the output signal of the mixing means 51 is adjusted by a gain adjustment means 49C to generate the phase control signal.

Figure 9:
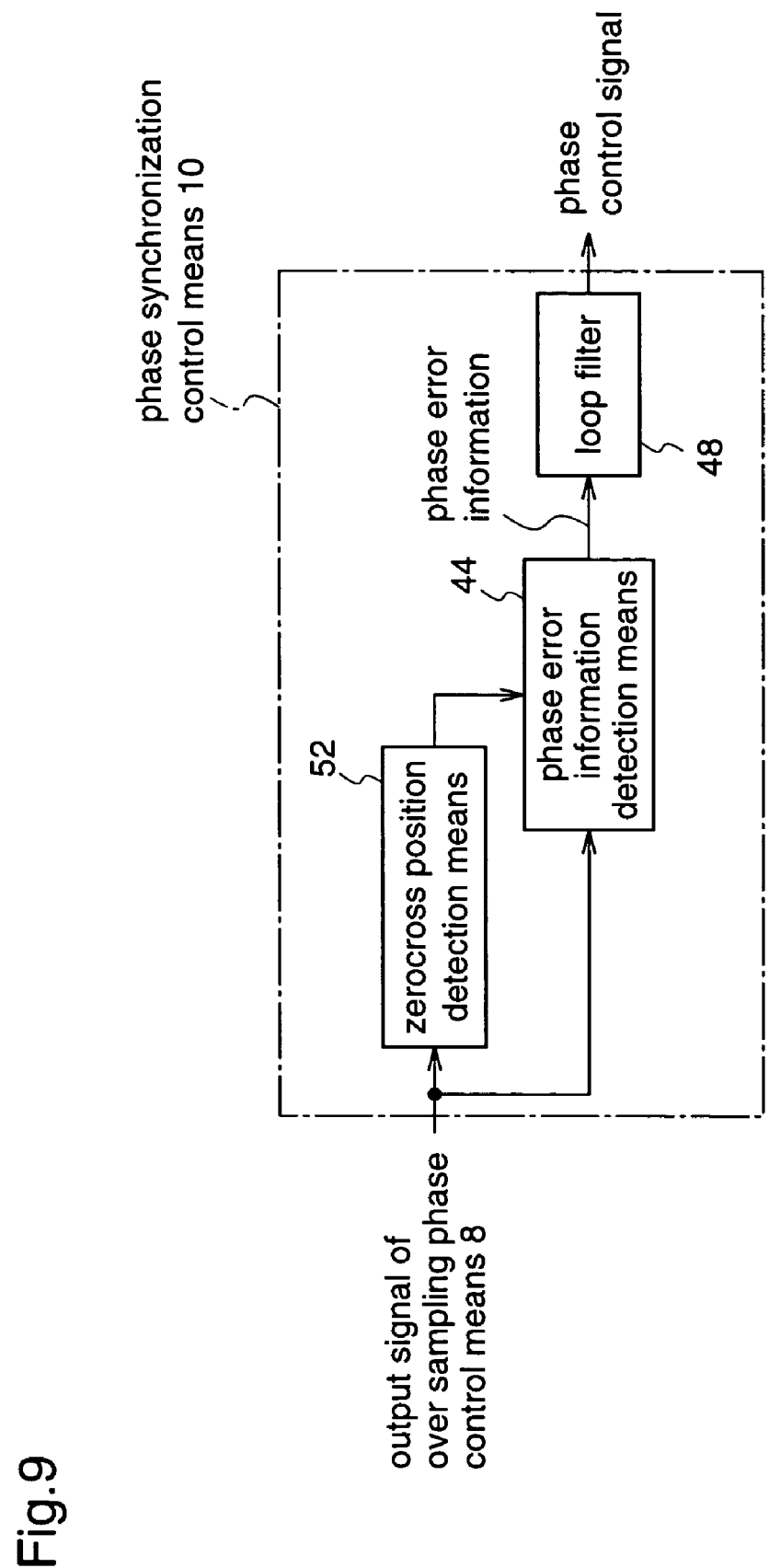
FIG. 9 is a block diagram illustrating the construction (example application) of the phase synchronization control means according to the first embodiment.

The phase synchronization control means 10 may be constructed as shown in FIG. 9. Hereinafter, the operation of this circuit will be described. However, this circuit is merely an example, and the present invention is not restricted thereto.

In the phase synchronization control means 10, the zerocross position information is detected by the zerocross position detection means 52 on the basis of the output signal of the over sampling phase control means 8, and the phase error information is detected by the phase error information detection means 44 on the basis of the output signal of the zerocross position information and the output signal of the over sampling phase control means 8. Next, the detected phase error information is subjected to filtering using the loop filter 48 to generate a phase control signal.

On the other hand, the digital signal recorded on the optical disc is demodulated by the digital data demodulation means 19. The digital data demodulation means 19 has both of the PRML (Partial Response Maximum Likelihood) signal processing means 17 for estimating a most-likely data string by utilizing interference between codes, which is intentionally added, and the level judgement binarization means 18 for performing demodulation by binarizing the output signal at the center level of the output signal, at which code balance is kept. The PRML signal processing means 17 and the level judgement binarization means 18 simultaneously output a demodulated binary signal A20 and a demodulated binary signal B21, respectively. Therefore, it is possible to appropriately use the two kinds of demodulated binary signals in real time according to the usage condition. For example, the demodulated binary signal B21 that is resistant to flaws may be used for an area having such as scratches or black dots on the optical disc, while using the demodulated binary signal A20 for the other area. Thereby, a high-quality binary judgement output can be obtained.

Figure 18:
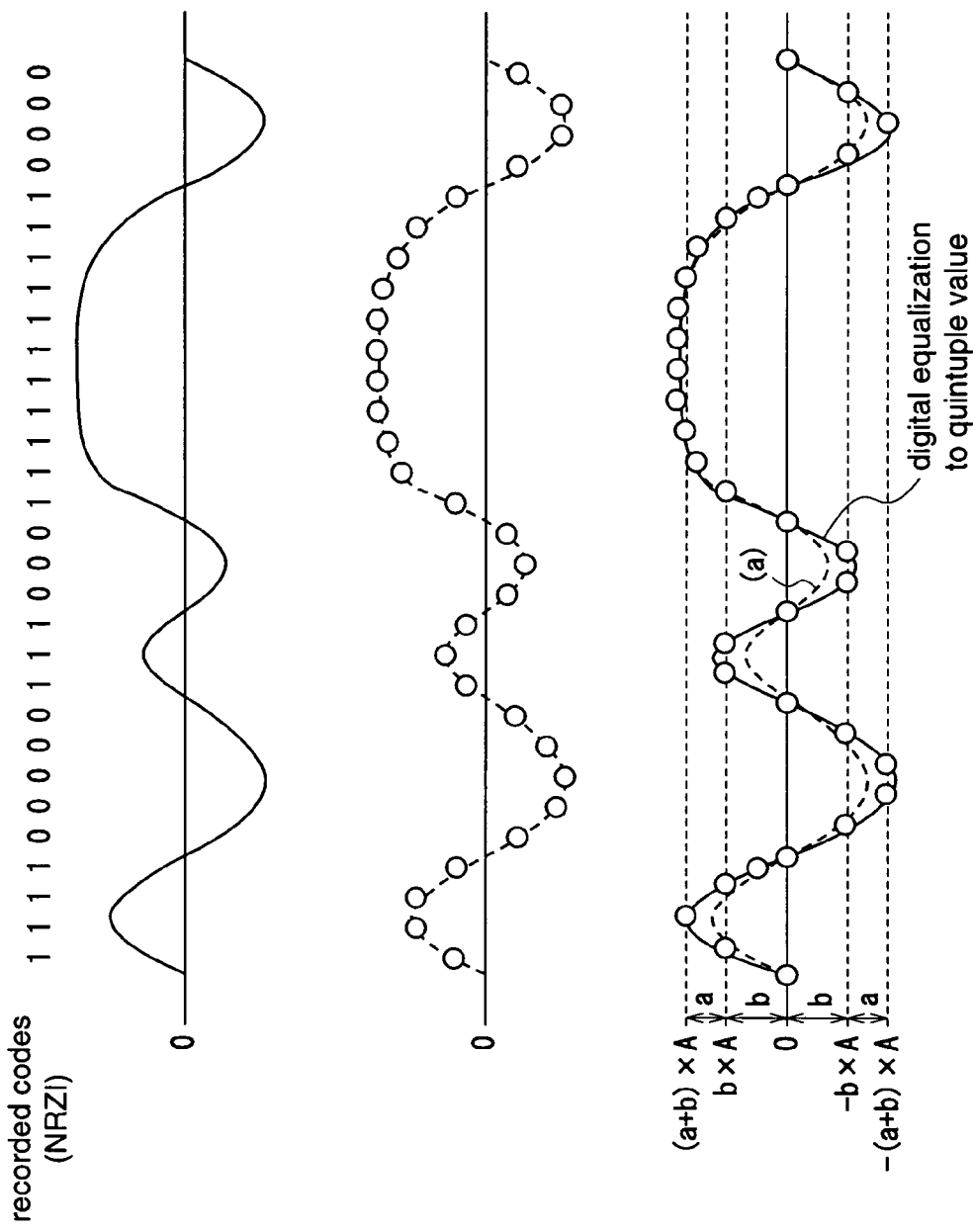
FIG. 18 is a diagram illustrating recorded data and output signal waveforms at the respective function blocks of the conventional optical disc playback apparatus.

More specifically, when higher-order partial response characteristics are used for the PRML signal processing, the discrete signal is digital-equalized to plural levels as shown in the lower stage in FIG. 18, and a most likely string is selected on the basis of the progression of these plural levels, and demodulated (maximum likelihood demodulation). Since the signal judgement is carried out after equalizing the partial response characteristics that intentionally cause interference between waveforms, high-performance demodulation can be performed against the playback signal that is degraded in quality and thereby has low S/N ratio, or tilt degradation that causes interference between waveforms. However, if the state where the distribution of the plural levels cannot be correctly judged due to amplitude fluctuation that is caused by flaws or the like, continues, an incorrect string might be selected, leading to demodulation errors. On the other hand, in the level judgement, the discrete signal shown in the middle stage in FIG. 18 is subjected to judgement of the polarity (positive or negative) and demodulation. Therefore, the level judgement is inferior to the PRML signal processing in the demodulation performance against the interference between waveforms in the linear direction, but it is hardly affected by amplitude fluctuation. Accordingly, it is possible to improve the demodulation performance by switching between the PRML signal processing and the level judgement, using a means for detecting abnormalities in the playback signal due to flaws or the like.

Figure 10:
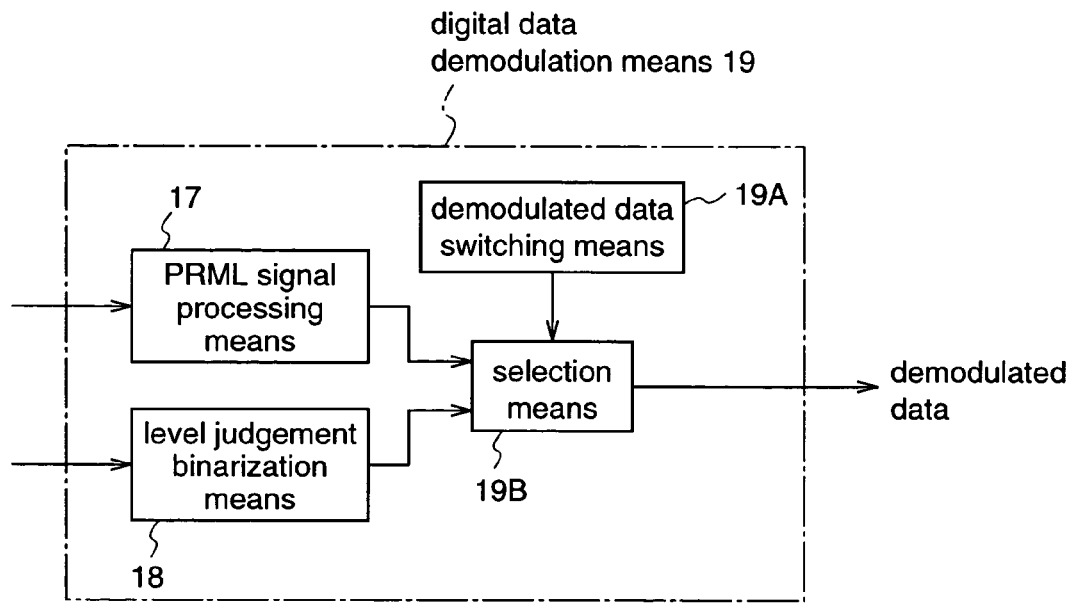
FIG. 10 is a block diagram illustrating the construction of a digital data demodulation means according to the first embodiment.
Figure 11:
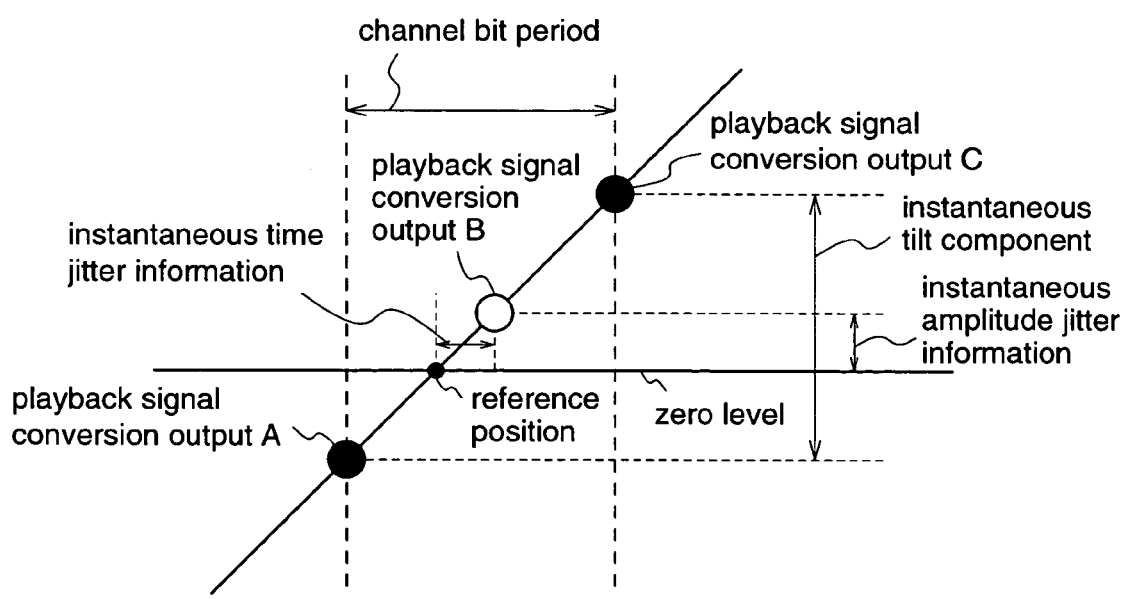
FIG. 11 is a diagram for explaining the principle of detecting jitter information by a jitter detection means according to the first embodiment.

For example, the digital data demodulation means 19 may be constructed as shown in FIG. 10. In FIG. 10, a demodulated data switching means 19A outputs, to a selection means 19B, a signal for selecting either the demodulated data outputted from the PRML signal processing means 17 or the demodulated data outputted from the level judgement binarization means 18, on the basis of the state of the playback signal or the result of error correction in the later stage. As for the result of error correction in the later stage, an output signal 212 from a decoding circuit 202, which is described later, may be used.

Next, the switching conditions of the demodulated data switching means 19A will be described. The demodulated data switching means 19A compares a peak level and a bottom level of the output signal of the A/D converter 5 to obtain a level difference. When the level difference is larger than a predetermined value, the demodulated data switching means 19A judges that amplitude fluctuation occurs due to flaws, contamination, or asymmetry, and instructs the selection means 19B to select the demodulated data outputted from the level judgement binarization means 18. Alternatively, the demodulated data switching means 19A monitors the peak level and the bottom level of the A/D converter 5. When the peak level or the bottom level fluctuates in a period that is judged as a long mark in the later-stage decoding circuit (refer to FIG. 15), the demodulated data switching means 19A judges that formation of pits on the optical disc is not sufficient due to high-speed recording or the like, and instructs the selection means 19B to select the demodulated data outputted from the level judgement binarization means 18. Further, when the selection means 19B selects the demodulated data outputted from the PRML signal processing means 17, if burst errors occur during decoding of recorded codes in the later-stage decoding circuit, the demodulated data switching means 19A judges that amplitude fluctuation occurs, and instructs the selection means 19B to select the demodulated data outputted from the level judgement binarization means 18. Furthermore, when more than predetermined number of decoding errors occur in the later-stage decoding circuit or when more than predetermined number of error corrections are carried out, the demodulated data switching means 19A instructs the selection means 19B to select the demodulated data that is different from the currently selected demodulated data.

On the other hand, the level judgement binarization means 18 may be constructed as described hereinafter. That is, the level judgement binarization means 18 outputs, as a demodulated binary signal B21, "0" when the playback signal conversion output C from the operation frequency conversion means 9 (a part of the PC 101 constituting the PLL 100) is positive, and outputs "1" when the output C is negative. At this time, the demodulated binary signal B21 may be delayed by the shift register to synchronize the demodulated binary signal B21 with the demodulation timing of the demodulated binary signal A20. Thereby, continuity of the demodulated data is not impaired even when the demodulated data switching means 19A performs switching at any timing, and therefore, the demodulated data is hardly lost when performing playback while switching between the demodulated binary signal A20 and the demodulated binary signal B21. Further, the level judgement binarization means 18 may be constituted so as to output, as a demodulated binary signal B21, "0" or "1" when the playback signal conversion output A from the operation frequency conversion means 9 is positive or negative, respectively.

As described above, since over sampling is carried out in the present invention, the signals required for the respective means are simultaneously sampled and simultaneously outputted at the maximum accuracy, while in the conventional apparatus accurate demodulated data cannot be generated by the level judgement binarization means 18 unless switching the sampling mode when the PRML signal processing means is selected as a demodulation means. As a result, in this present invention, the system can be constituted and operated independently of the type of the optical disc, speed, and playback method. Especially, it is possible to enhance the playability for various kinds of discs by appropriately selecting, in real time, either the demodulated binary signal A20 obtained by the PRML signal processing method that is effective to linear-direction high-density recording/playback or the demodulated binary signal B21 obtained by the level judgement binarization means 18 that enables stable playback when burst errors occur due to defects or the like.

Furthermore, in this system, highly accurate jitter information 23 can be extracted by the jitter detection means 22. Hereinafter, the principle of accurate jitter detection will be described with reference to FIG. 11.

Initially, the jitter detection uses, as input signals, the playback signal conversion outputs A, B, and C which are output signals from the operation cycle conversion means 9, and the zerocross position conversion output. When the playback signal conversion output B is judged as a zerocross position by the zerocross position conversion output, the jitter detection means 22 calculates the absolute value of a difference between the playback signal conversion output C and the playback signal conversion output A. As a result, an instantaneous tilt component shown in FIG. 10 is calculated. The instantaneous tilt component corresponds to a channel bit cycle when the optical playback signal is projected in the time direction when the vicinity of the center level of the optical playback signal has linearity. Assuming that the absolute value of the distance in the amplitude direction from the zero level of the playback signal conversion output B at this time is instantaneous amplitude jitter information, if this signal is projected in the time direction, it corresponds to instantaneous time jitter information. The following relationship is derived from the instantaneous time information. Note that "| |" indicates an absolute value.

|instantaneous time jitter information|/|channel bit cycle|=|instantaneous amplitude jitter information|/|instantaneous tilt component|

Accordingly, the jitter information at the zerocross point can be calculated from the following relationship.

|playback signal conversion output B|/|(playback signal conversion output C)−(playback signal conversion output A)|

The extracted jitter information per zerocross is subjected to smoothing to extract highly accurate jitter information.

Figure 12:
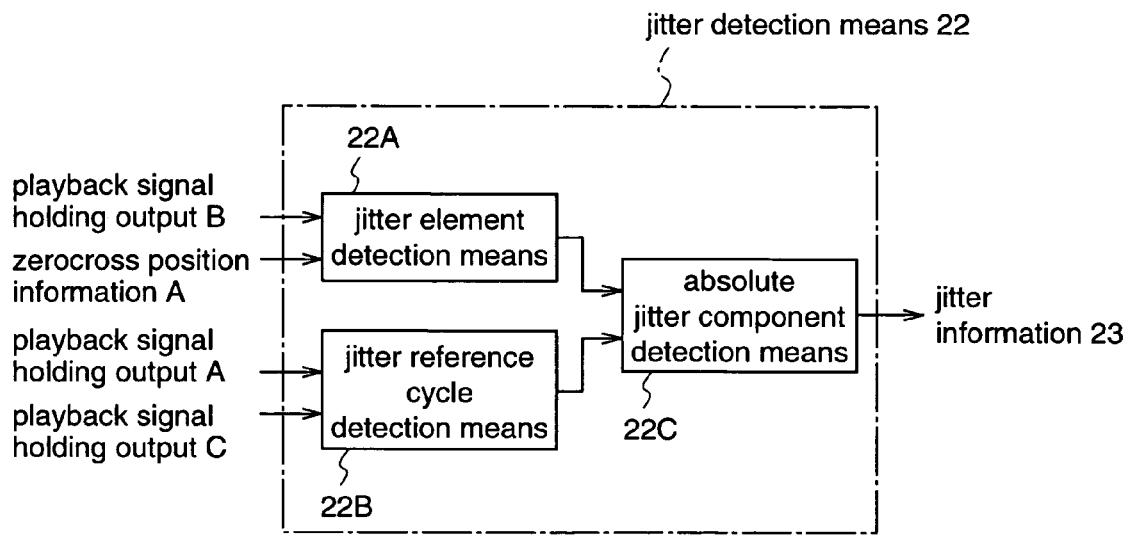
FIG. 12 is a block diagram illustrating the construction of the jitter detection means according to the first embodiment.

Accordingly, the jitter detection means 22 shown in FIG. 1 may comprise, as shown in FIG. 12, a jitter element detection means 22A for detecting an absolute value component in the amplitude direction at the zerocross point on the basis of the output signal of the playback signal holding means B39 and the output signal of the polarity inversion information holding means 42, a jitter reference cycle detection means 22B for calculating the distance in the amplitude direction from the output signal of the playback signal holding means A40 and the output signal of the playback signal holding means C38, and an absolute jitter component detection means 22C for detecting the jitter component by dividing the output signal of the jitter element detection means 22 by the output signal of the jitter reference cycle detection means 22B.

Figure 13:
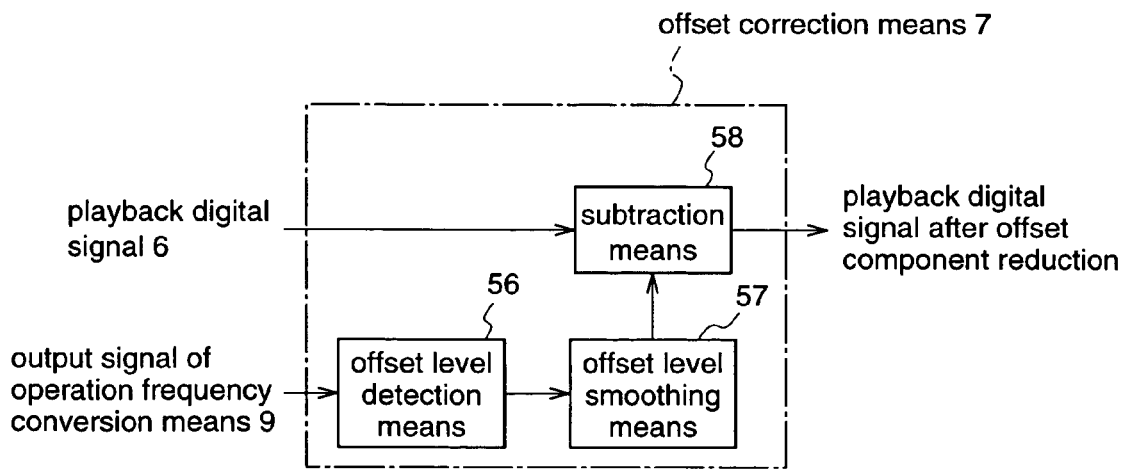
FIG. 13 is a block diagram illustrating the construction of an offset correction means according to the first embodiment.

Further, the above-described offset correction means 7 may be constructed as shown in FIG. 13. Hereinafter, the operation of this circuit will be described. However, the circuit is merely an example, and the present invention is not restricted thereto.

In the offset correction means 7, an offset level detection means 56 detects offset level information in the amplitude direction from the output signal of the operation cycle conversion means 9, and an offset level smoothing means 57 smoothes the offset level information in the amplitude direction. Next, a subtraction means 58 subtracts the smoothed offset level information in the amplitude direction from the playback digital signal 6, thereby reducing the offset component in the amplitude direction, which is included in the playback digital signal 6.

Figure 14:
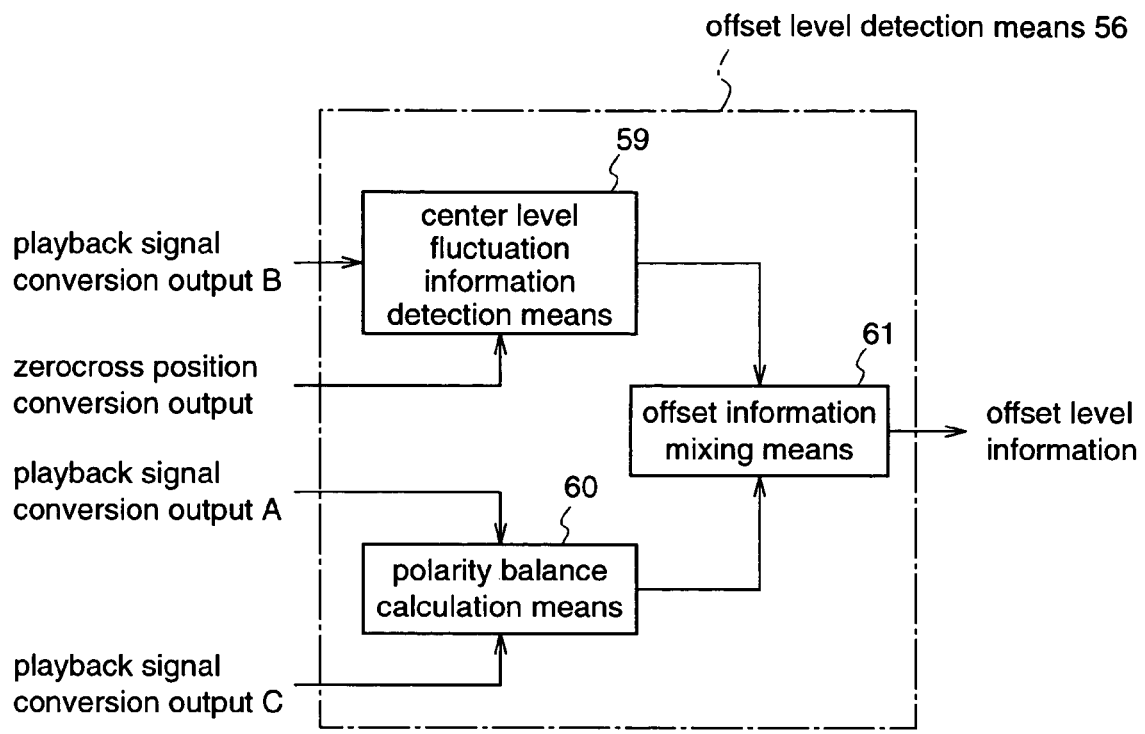
FIG. 14 is a block diagram illustrating the construction of an offset level detection means according to the first embodiment.

The offset level detection means 56 may have the construction shown in FIG. 14. Hereinafter, the operation of this circuit will be described. However, this circuit is merely an example, and the present invention is not restricted thereto.

In the offset level detection means 56, a center level fluctuation information detection means 59 outputs the playback signal conversion output B as center level fluctuation information when the playback conversion output B corresponding to the zerocross position conversion output shown in FIG. 6 is judged as the zerocross position. Then, a polarity balance calculation means 60 adds "1" when the polarities of the playback signal conversion output A and the playback signal conversion output C are positive, and adds "−1" when the polarities are negative, and accumulates these information. At this time, the cumulative signal becomes information indicating the balance of code-wise polarities of the output signal of the offset correction means 7, and therefore, offset information with respect to the code-wise center level can also be extracted on the basis of the information. Next, an offset information mixing means 61 adds the center level fluctuation information and the code-wise polarity balance information at an arbitrary ratio to generate offset level information. The polarity balance calculation means 60 may accumulate the polarities of the playback signal holding means, which are obtained at timings synchronized with the over sampling clock 12 in one cycle of channel bit clock 14, thereby to enhance the accuracy.

As described above, in the playback signal processing apparatus having the construction shown in FIGS. 1 to 14, the PLL is constituted using the multiple-bit discrete signal based on the over sampling clock synchronized with the channel bit frequency. Therefore, the construction of the PRML signal processing means is simplified, and an increase in delay time of the control loop is minimized, whereby degradation in the phase-locked pull-in performance can be minimized. Therefore, it is possible to make full use of effectiveness of the PRML signal processing method, and stable playback can be carried out even when playing an optical disc whose original signal quality is poor or when tilt degradation occurs. Further, since the over sampling clock is supplied to only required positions, increases in the circuit scale and power consumption can be minimized.

Furthermore, it is possible to simultaneously obtain a signal according to the PRML signal processing method that is effective to high-density recording/playback in the linear direction of a disc, and a signal according to the level judgement method that enables stable playback against burst errors caused by defects or the like, and therefore, the optimum playback method can be instantaneously selected by detecting the state of the disc.

Furthermore, the information in the time direction is increased by sing the over sampling clock, resulting in an increase in jitter detecting accuracy.

Figure 15:
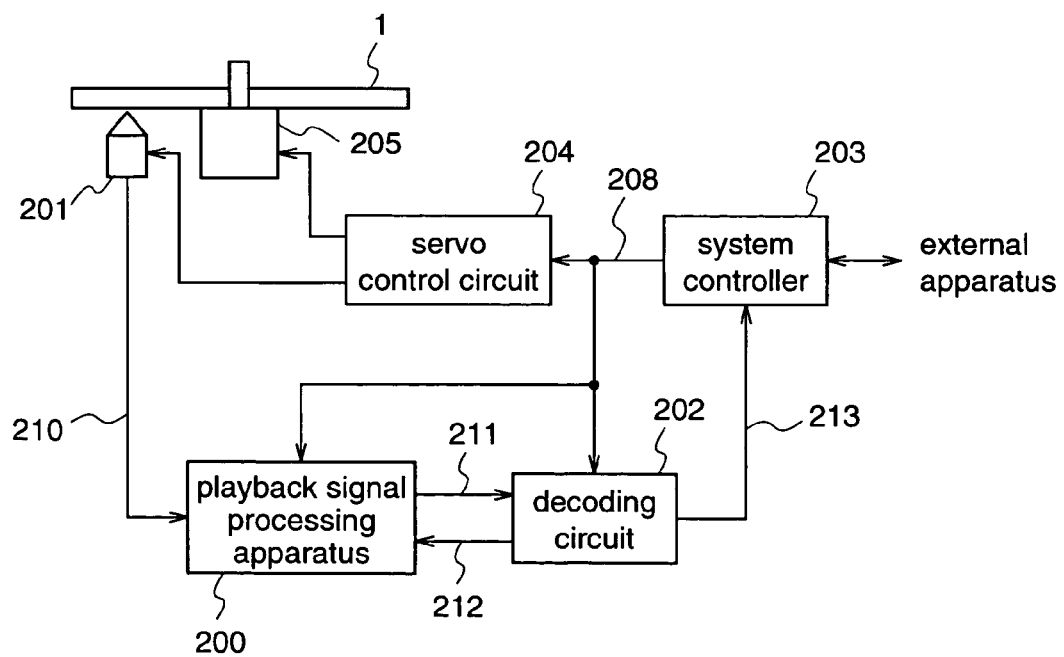
FIG. 15 is a block diagram illustrating the construction of an over sampling type optical recording/playback apparatus according to the first embodiment.

FIG. 15 is a block diagram illustrating an over sampling type optical recording/playback apparatus having the playback signal processing apparatus 200 according to the present invention. In FIG. 15, an optical disc playback signal 210 (73 in FIG. 1) supplied from an optical pickup 201 (optical playback means 2 in FIG. 1) is input to the playback signal processing apparatus 200. The playback signal processing apparatus 200 has the construction shown in FIG. 1, and outputs binary data 211 (20 and 21 in FIG. 1). A decoding circuit 202 demodulates the binary data 211 to capture data 213 recorded on an optical disc 1, and outputs decoding information and error correction information 212 to the playback signal processing apparatus 200. A system controller 203 performs communication and data exchange with an external apparatus such as a personal computer, and controls the respective blocks. The system controller 203 outputs the signal 213 that is recorded on the optical disc and demodulated by the decoding circuit 202, to the external apparatus, and receives a signal to be written in the optical disc, from the external apparatus. The playback signal processing apparatus 200, the decoding circuit 202, and the servo control circuit 204 are controlled by a control signal 208. The playback signal processing apparatus 200 performs demodulation according to either the PRML signal processing method or the level judgement method, on the basis of the control signal 208. Further, the servo control circuit 204 performs servo control for a spindle motor 205 that rotates the optical pickup 201 and the optical disc, on the basis of the control signal 208.

As described above, the over sampling type optical recording/playback apparatus shown in FIG. 15 uses the playback signal processing apparatus 200 having the construction shown in FIGS. 1 through 14, whereby the circuit scale and power consumption of the playback signal processing apparatus 200 can be minimized, and a high-quality playback signal can be obtained. Further, two kinds of playback signals, i.e., a signal based on the PRML signal processing method and a signal based on the level judgement method, can be obtained, whereby an optimum playback signal can be selected according to control of the system controller. Further, since the amount of information in the time direction increases, jitter detection accuracy is improved, and learning of cutoff frequency or boost amount during focus servo or waveform equalization is converged to an optimum value, thereby minimizing degradation in playback performance.

As described above, according to the first embodiment, when demodulating the digital data recorded on the optical disc, A/D conversion is carried out by using the over sampling clock having a frequency N times (N: multiple of 2) as high as the channel bit clock. Therefore, the delay time in the PLL can be reduced, and the phase-locked pull-in control is prevented from breaking down against degradation in quality of the playback waveform due to a tilt that is defined by an angle between the axis perpendicular to the recording surface of the optical disc and the axis of the incoming laser beam, undesirable playback user poor S/N ratio, asymmetry of upper and lower portions of the playback waveform, and local degradation in playback characteristics depending on defects such as flaws, contamination, or fingerprints on the disc surface. As a result, it is possible to make full use of the PRML signal processing method, resulting in an increase in the marginal playback performance.

Furthermore, since the PRML signal processing method that is advantageous for linear-direction high-density recording/playback is applied, the quality of demodulated data is improved as compared with the conventional method, and simultaneously, a signal required for executing the level judgement method for level-judging the output of the phase comparator that constitutes the PLL by over sampling. Therefore, when burst errors occur frequently due to defects or the like, the output signal of the level judgement mode for level-judging the output of the phase comparator as a component of the PLL can be selected in real time, thereby providing a versatile playback signal processing apparatus as well as an optical disc recording/playback apparatus equipped with the processing apparatus.

Furthermore, the over sampling clock is used only in a position where the over sampling clock is required while a lower-rate clock that is obtained by the operation frequency conversion means is used in the other position, whereby an increase in circuit scale caused by an increase in the clock rate can be minimized.

Furthermore, since the information in the time direction increases, the jitter detection accuracy is enhanced, and learning of focus servo or waveform equalization can be optimized.

While in the present invention the playback signal processing apparatus is applied to the optical disc recording/playback apparatus, it may be applied to a playback-only optical disc device or a playback system such as a magnetic disc apparatus.

While in the present invention two kinds of binary signals are obtained by the PRML signal processing method and the level judgement method, respectively, a binary signal may be obtained by a method other than the level judgement method.

Figure 16:
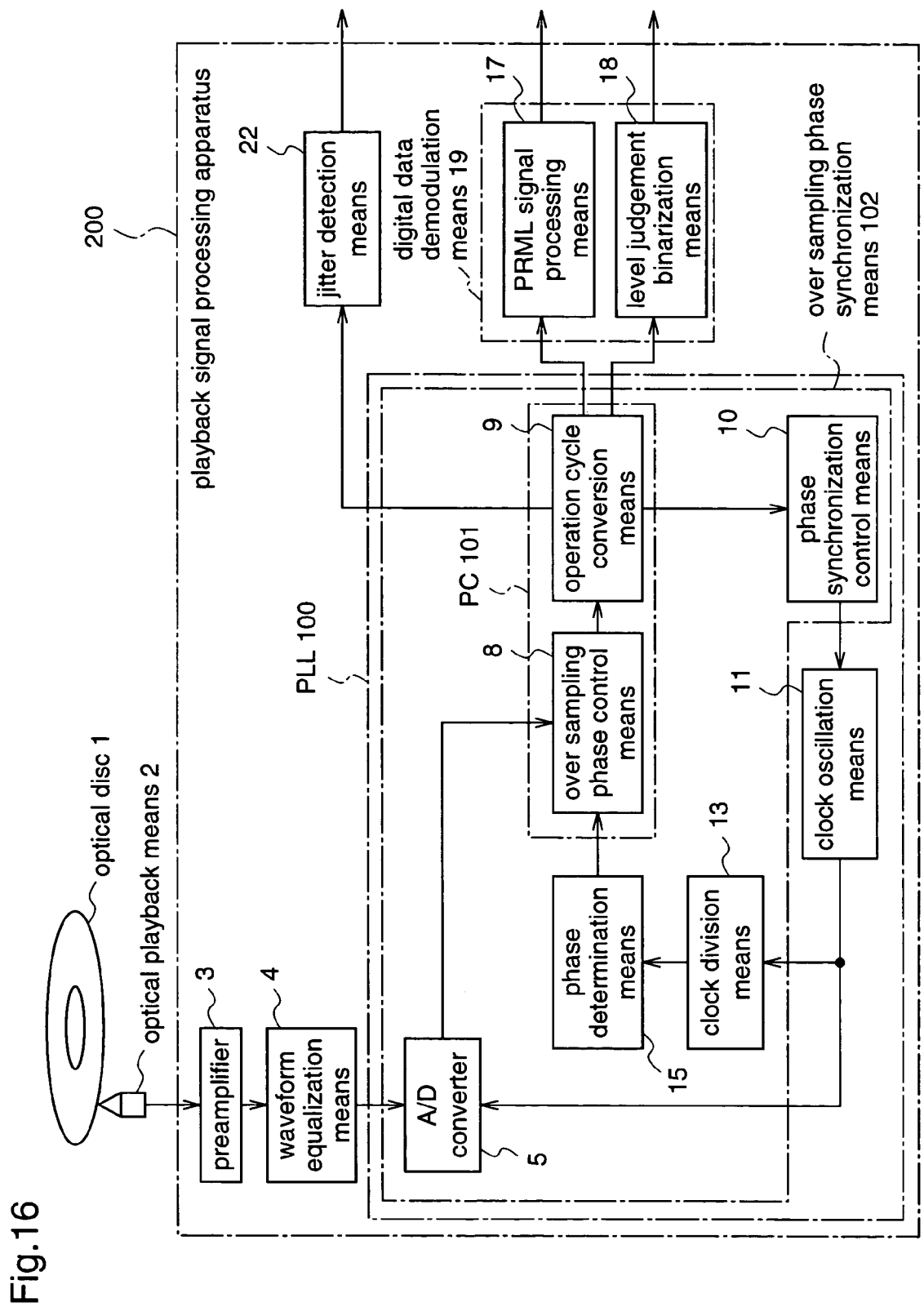
FIG. 16 is a block diagram illustrating another construction of the playback signal processing apparatus according to the first embodiment.
Figure 17:
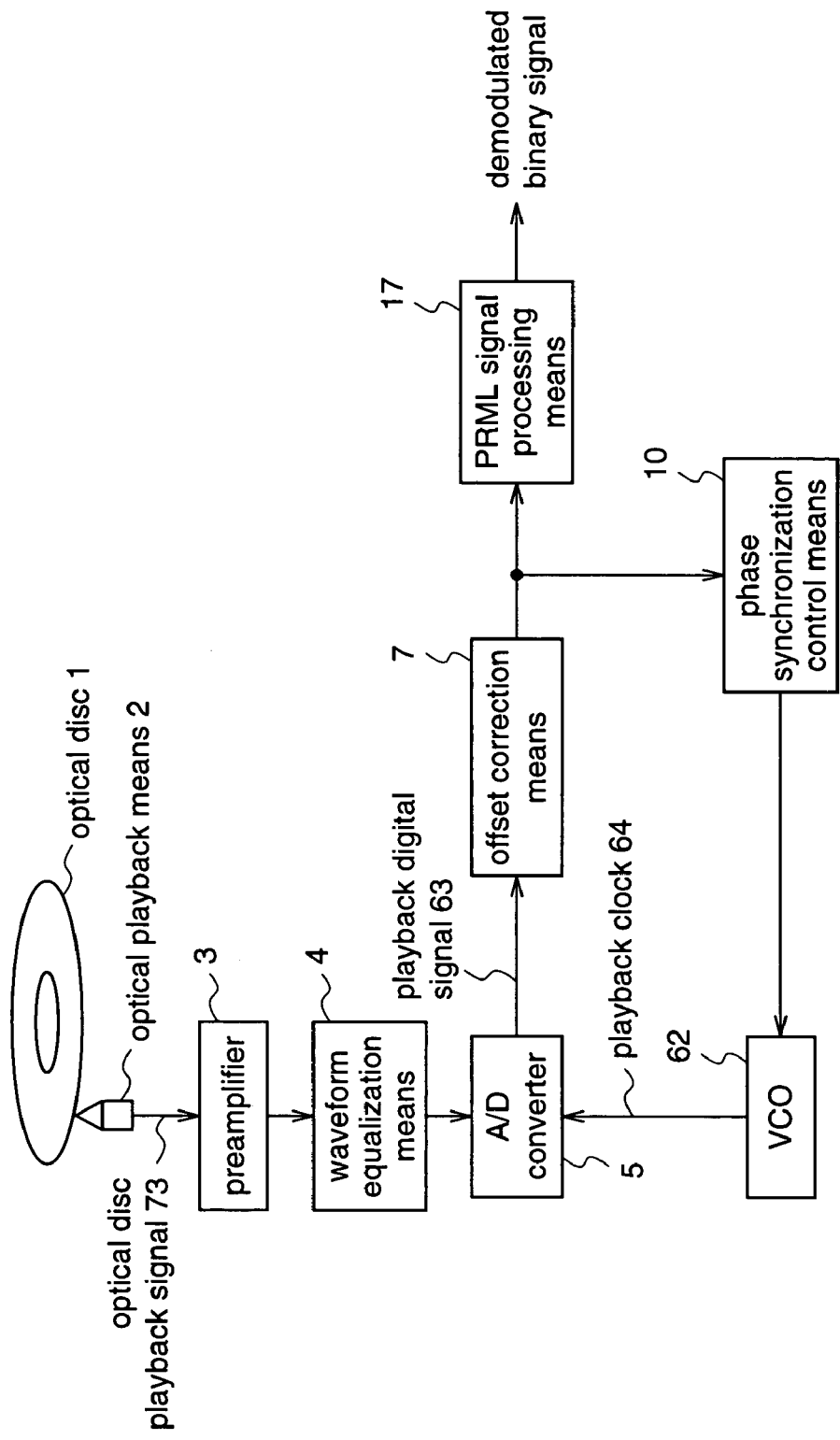
FIG. 17 is a block diagram illustrating the construction of the conventional optical disc playback apparatus.

While in the present invention the PLL 100 includes the offset correction means 7, the PLL 100 may include no offset correction means as shown in FIG. 16, and the output signal from the A/D converter 5 may be directly input to the over sampling phase control means 8. At this time, an offset correction means may be provided so as to perform offset correction for the analog signal that has not yet been sampled by the A/D converter 5.

Further, in the present invention, as shown in FIG. 7(*a*), the zerocross position detection means is not included in the phase synchronization control means 10, and the polarity judgement detection means and the polarity inversion information holding means, which correspond to the zerocross position detection means, are included in the over sampling phase control means 8. However, these means may be included in the other circuit block, or it may be included in the phase synchronization control means 10.

Furthermore, the zerocross position detection means may be implemented by means other than the polarity judgement detection means and the polarity inversion information holding means.

As described above, the playback signal processing apparatus and the optical disc device according to the present invention employ, as a playback clock, the over sampling clock that is synchronized with the channel bit signal, whereby delay time in the PLL can be reduced, and the output signal by the PRML signal processing method that is advantageous to linear-direction high-density playback is improved as compared with the conventional method. Moreover, two kinds of binary signals can always be obtained by the PRML signal processing method and the level judgement method, and switching between these signals is possible as required, resulting in an increase in playability of the optical disc device.

What is claimed is:

1. A playback signal processing apparatus including:
   an over sampling phase synchronization unit for
      converting a playback waveform which is obtained by reproducing a digital signal recorded on an information storage medium with an information playback unit, into a multiple-bit discrete signal by using an over sampling clock that is synchronized with a frequency N times (N: a multiple of 2, N$\geq$2) as high as a frequency of a channel bit clock of the digital signal, and
      generating, from the multiple-bit discrete signal, first, second, and third digital data which have different phases and are synchronized with the frequency of the channel bit clock; and
   a digital data demodulation unit having a first demodulation unit for demodulating the first digital data, and a second demodulation unit for demodulating the second digital data or the third digital data.

2. A playback signal processing apparatus as defined in claim 1 wherein said over sampling phase synchronization unit comprises:
   an analog-to-digital conversion unit for converting the playback waveform into the multiple-bit discrete signal using the over sampling clock;
   a clock division unit for reducing the frequency of the over sampling clock to 1/N to generate a channel bit clock;
   a phase determination unit for uniquely determining the relationship in phases between the channel bit clock and the over sampling clock;
   an over sampling phase control unit for converting an output signal of the analog-to-digital conversion unit into a pre-demodulation signal and a control signal on the basis of an output signal of the phase determination unit;
   an operation cycle conversion unit for converting an output signal that is outputted from the over sampling phase control unit in synchronization with the over sampling clock, into a signal that operates in synchronization with the channel bit clock; and
   a phase synchronization control unit which operates in synchronization with the channel bit clock, for detecting phase error information from the output of the operation cycle conversion unit, and modulating the over sampling clock generated by a clock oscillation unit so as to bring the phase error information close to zero.

3. A playback signal processing apparatus as defined in claim 2 wherein said phase determination unit comprises:
an edge generation unit for generating a signal that is required for detecting either a rising edge or a falling edge of the channel bit clock;
a reference flag generation unit for generating a reference flag for a signal that is outputted from the edge generation unit at a timing synchronized with the over sampling clock; and
a reference flag delay unit for delaying the reference flag by an arbitrary number of over sampling clocks to generate a phase reference signal used for uniquely determining the relationship in phases between the channel bit clock and the over sampling clock.

4. A playback signal processing apparatus as defined in claim 2 wherein said over sampling phase control unit comprises:
a plurality of playback signal delay units for delaying and holding an output signal of said analog-to-digital conversion unit, at every clock, at a timing synchronized with the over sampling clock;
a plurality of playback signal holding units for holding the output signals of the plural playback signal delay units, at a timing of a phase reference signal generated by the phase determination unit;
a polarity inversion detection unit for judging whether the polarities of predetermined two output signals among the output signals of the plural playback signal delay units are inverted or not; and
a polarity inversion information holding unit for holding an output signal of the polarity inversion detection unit at the timing of the phase reference signal.

5. A playback signal processing apparatus as defined in claim 4 wherein
said plurality of playback signal delay units include:
a playback signal delay unit A for outputting a playback signal which is positioned in a phase that is apart by a predetermined amount of phase from the reference phase of the channel bit clock whose cycle is expressed by 2π (π=ratio of the circumference of a circle to its diameter),
a playback signal delay unit C for outputting a playback signal which is positioned in a phase that is apart by 2π from the playback signal delay unit A, and
a playback signal delay unit B for outputting a playback signal that is positioned in a phase apart by π from the playback signal delay unit A, which unit B is located midway between the playback signal delay unit A and the playback signal delay unit C;
said plurality of playback signal holding units have playback signal holding units A, B, and C for holding the output signals from the playback signal delay units A, B, and C at the timing of the phase reference signal, respectively;
said polarity inversion detection unit judges whether the polarities are inverted or not, on the basis of the output signals of the playback signal delay units A and C among the plural playback signal delay units; and
said playback signal holding unit B outputs a basic signal for detecting phase error information from the output of the over sampling phase control unit.

6. A playback signal processing apparatus as defined in claim 5 wherein
among the plurality of playback signal delay units, said playback signal delay unit A outputs a playback signal corresponding to a phase of zero of the channel bit clock whose cycle is expressed by 2π (π=ratio of the circumference of a circle to its diameter);
said playback signal delay unit C outputs a playback signal corresponding to a phase of 2π of the channel bit clock; and
said playback signal delay unit B outputs a playback signal corresponding to a phase of π of the channel bit clock.

7. A playback signal processing apparatus as defined in claim 2 wherein
said phase synchronization control unit comprises:
a zerocross position detection unit for detecting zerocross position information of the output signal of the over sampling phase control unit,
a phase error information detection unit for detecting phase error information between the zerocross position information and the output signal of the over sampling phase control unit, and
a loop filter for smoothing the phase error information; and
said phase synchronization control unit operates in synchronization with the cycle of the over sampling clock.

8. A playback signal processing apparatus as defined in claim 7 further including:
a playback signal delay unit A for outputting a playback signal which is positioned in a phase that is apart by a predetermined amount of phase from the reference phase of the channel bit clock whose cycle is expressed by 2π (π=ratio of the circumference of a circle to its diameter),
a playback signal delay unit C for outputting a playback signal which is positioned in a phase that is apart by 2π from the playback signal delay unit A, and
a playback signal delay unit B for outputting a playback signal that is positioned in a phase apart by π from the playback signal delay unit A, which unit B is located midway between the playback signal delay unit A and the playback signal delay unit C;
wherein said phase error information detection unit controls the polarity of the output signal of the playback signal holding unit B to detect it as phase error information, among the playback signal holding units A, B, and C which hold the output signals of the playback signal delay units A, B, and C at the timing of the phase reference signal, respectively, when a polarity inversion detection unit for judging whether the polarities are inverted or not on the basis of the output signals of the playback signal delay units A and C judges that the polarities of the output signals of the playback signal delay units A and C among the plural playback signal delay units are inverted, and either the rising edge or the falling edge of the optical playback waveform is detected.

9. A playback signal processing apparatus as defined in claim 1 wherein
said digital data demodulation unit includes,
as the first demodulation unit, a PRML (Partial Response Maximum Likelihood) signal processing unit for estimating a most likely data string by utilizing an interference between codes which is intentionally added to the output signal of the operation cycle conversion unit, and
as the second demodulation unit, a level judgement binarization unit for demodulating digital data by binarizing the output signal of the operation cycle conversion unit on the basis of a center level of the output signal at which code balance is kept; and both of the PRML signal processing unit and the level judgement binarization unit are operated in synchronization with the channel bit clock.

10. A playback signal processing apparatus as defined in claim 9 further including:
a playback signal delay unit A for outputting a playback signal which is positioned in a phase that is apart by a predetermined amount of phase from the reference phase of the channel bit clock whose cycle is expressed by $2\pi$ ($\pi$=ratio of the circumference of a circle to its diameter),
a playback signal delay unit C for outputting a playback signal which is positioned in a phase that is apart by $2\pi$ from the playback signal delay unit A, and
a playback signal delay unit B for outputting a playback signal that is positioned in a phase apart by $\pi$ from the playback signal delay unit A, which unit B is located midway between the playback signal delay unit A and the playback signal delay unit C;
wherein said PRML signal processing unit demodulates data of a signal that is obtained by converting the operation cycle of the output signal of the playback signal holding unit B using the operation cycle conversion unit, among the playback signal holding units A, B, and C which hold the output signals of the playback signal delay units A, B, and C at the timing of the phase reference signal, respectively.

11. A playback signal processing apparatus as defined in claim 9 further including:
a playback signal delay unit A for outputting a playback signal which is positioned in a phase that is apart by a predetermined amount of phase from the reference phase of the channel bit clock whose cycle is expressed by $2\pi$ ($\pi$=ratio of the circumference of a circle to its diameter),
a playback signal delay unit C for outputting a playback signal which is positioned in a phase that is apart by $2\pi$ from the playback signal delay unit A, and
a playback signal delay unit B for outputting a playback signal that is positioned in a phase apart by $\pi$ from the playback signal delay unit A, which unit B is located midway between the playback signal delay unit A and the playback signal delay unit C;
wherein said level judgement binarization unit demodulates data of a pre-binarization signal that is obtained by converting the operation cycle of either of the output signals from the playback signal holding units A and C using the operation cycle conversion unit, among the playback signal holding units A, B, and C which hold the output signals of the playback signal delay units A, B, and C at the timing of the phase reference signal, respectively.

12. A playback signal processing apparatus as defined in claim 1 wherein
said digital data demodulation unit further includes a demodulation data switching unit and a selection unit; and
said selection unit selects either the output signal of the first demodulation unit or the output signal of the second demodulation unit using a selection signal from the demodulation, and outputting the selected signal as demodulated data.

13. A playback signal processing apparatus as defined in claim 2 wherein
said over sampling phase synchronization unit further includes an offset correction unit for reducing an offset component in the amplitude direction from the multiple-bit discrete signal, and outputting the signal to the over sampling phase control unit.

14. A playback signal processing apparatus as defined in claim 13 wherein said offset correction unit comprises:
an offset level detection unit for detecting offset level information in the amplitude direction from the output signal of the over sampling phase control unit;
an offset level smoothing unit for smoothing the offset level information in the amplitude direction; and
an offset level subtraction unit for subtracting the output signal of the offset level smoothing unit from the multiple-bit discrete signal to reduce the offset component.

15. A playback signal processing apparatus as defined in claim 14 further including:
a playback signal delay unit A for outputting a playback signal which is positioned in a phase that is apart by a predetermined amount of phase from the reference phase of the channel bit clock whose cycle is expressed by $2\pi$ ($\pi$=ratio of the circumference of a circle to its diameter),
a playback signal delay unit C for outputting a playback signal which is positioned in a phase that is apart by $2\pi$ from the playback signal delay unit A, and
a playback signal delay unit B for outputting a playback signal that is positioned in a phase apart by $\pi$ from the playback signal delay unit A, which unit B is located midway between the playback signal delay unit A and the playback signal delay unit C;
wherein said offset level detection unit comprises:
a center level fluctuation information detection unit for detecting fluctuation information in the center level of the playback signal, from the output signal of the playback signal holding unit B among the playback signal holding units A, B, and C for holding the output signals of the playback signal delay units A, B, and C at the timing of the phase reference signal, respectively, and the output signal of the polarity inversion detection unit for judging whether the polarities are inverted or not on the basis of the output signals of the playback signal delay units A and C;
a polarity balance calculation unit for detecting polarity balance information by accumulating polarity information from the output signal corresponding to one cycle of the channel bit clock, among the output signals of the plurality of playback signal holding units; and
an offset information mixing unit for adding the center level fluctuation information and the polarity balance information at a predetermined ratio to detect an offset level.

16. A playback signal processing apparatus as defined in claim 14 further including:
a playback signal delay unit A for outputting a playback signal which is positioned in a phase that is apart by a predetermined amount of phase from the reference phase of the channel bit clock whose cycle is expressed by $2\pi$ ($\pi$=ratio of the circumference of a circle to its diameter),
a playback signal delay unit C for outputting a playback signal which is positioned in a phase that is apart by $2\pi$ from the playback signal delay unit A, and
a playback signal delay unit B for outputting a playback signal that is positioned in a phase apart by $\pi$ from the playback signal delay unit A, which unit B is located midway between the playback signal delay unit A and the playback signal delay unit C;

wherein said offset level detection unit comprises:
a center level fluctuation information detection unit for detecting fluctuation information in the center level of the playback signal, from the output signal of the playback signal holding unit B among the playback signal holding units A, B, and C for holding the output signals of the playback signal delay units A, B, and C at the timing of the phase reference signal, respectively, and the output signal of the polarity inversion detection unit for judging whether the polarities are inverted or not on the basis of the output signals of the playback signal delay units A and C;
polarity balance calculation unit for detecting polarity balance information by accumulating polarity information from the output signal corresponding to one cycle of the channel bit clock, among the output signals of the plurality of playback signal holding units; and
an offset information mixing unit for adding the center level fluctuation information and the polarity balance information at a predetermined ratio to detect an offset level.

17. An optical disc device comprising:
a spindle motor for rotating an optical disc;
an optical pickup for reading a playback signal from the optical disc;
a playback signal processing apparatus defined in claim 1, for processing the playback signal that is read by the optical pickup;
a decoding circuit for demodulating the signal processed by the playback signal processing apparatus, and subjecting the demodulated signal to error processing;
a servo control circuit for controlling the spindle motor and the optical pickup; and
a system controller for carrying out data communication with external devices, and controlling the respective function blocks.

18. A playback signal processing apparatus including:
an over sampling phase synchronization unit for
converting a playback waveform which is obtained by reproducing a digital signal recorded on an information storage medium with an information playback unit, into a multiple-bit discrete signal by using an over sampling clock that is synchronized with a frequency N times (N: a multiple of 2, N≧2) as high as a frequency of a channel bit clock of the digital signal, and
generating, from the multiple-bit discrete signal, first, second, and third digital data which have different phases and are synchronized with the frequency of the channel bit clock; and
a jitter detection unit for detecting a jitter component of the playback waveform, using the first, second, and third digital data.

19. A playback signal processing apparatus as defined in claim 18 wherein said over sampling phase synchronization unit comprises:
an analog-to-digital conversion unit for converting the playback waveform into the multiple-bit discrete signal using the over sampling clock;
a clock division unit for reducing the frequency of the over sampling clock to 1/N to generate a channel bit clock;
a phase determination unit for uniquely determining the relationship in phases between the channel bit clock and the over sampling clock;
an over sampling phase control unit for converting an output signal of the analog-to-digital conversion unit into a pre-modulation signal and a control signal on the basis of an output signal of the phase determination unit;
an operation cycle conversion unit for converting an output signal that is outputted from the over sampling phase control unit in synchronization with the over sampling clock, into a signal that operates in synchronization with the channel bit clock; and
a phase synchronization control unit which operates in synchronization with the channel bit clock, for detecting phase error information from the output of the operation cycle conversion unit, and modulating the over sampling clock generated by a clock oscillation unit so as to bring the phase error information close to zero.

20. A playback signal processing apparatus as defined in claim 19 wherein said phase determination unit comprises:
an edge generation unit for generating a signal that is required for detecting either a rising edge or a falling edge of the channel bit clock;
a reference flag generation unit for generating a reference flag for a signal that is outputted from the edge generation unit at a timing synchronized with the over sampling clock; and
a reference flag delay unit for delaying the reference flag by an arbitrary number of over sampling clocks to generate a phase reference signal used for uniquely determining the relationship in phases between the channel bit clock and the over sampling clock.

21. A playback signal processing apparatus as defined in claim 19 wherein said over sampling phase control unit comprises:
a plurality of playback signal delay units for delaying and holding an output signal of said analog-to-digital conversion unit, at every clock, at a timing synchronized with the over sampling clock;
a plurality of playback signal holding units for holding the output signals of the plural playback signal delay units, at a timing of a phase reference signal generated by the phase determination unit;
a polarity inversion detection unit for judging whether the polarities of predetermined two output signals among the output signals of the plural playback signal delay units are inverted or not; and
a polarity inversion information holding unit for holding an output signal of the polarity inversion detection unit at the timing of the phase reference signal.

22. A playback signal processing apparatus as defined in claim 21 wherein
said plurality of playback signal delay units include:
a playback signal delay unit A for outputting a playback signal which is positioned in a phase that is apart by a predetermined amount of phase from the reference phase of the channel bit clock whose cycle is expressed by $2\pi$ ($\pi$=ratio of the circumference of a circle to its diameter),
a playback signal delay unit C for outputting a playback signal which is positioned in a phase that is apart by $2\pi$ from the playback signal delay unit A, and
a playback signal delay unit B for outputting a playback signal that is positioned in a phase apart by $\pi$ from the playback signal delay unit A, which unit B is located midway between the playback signal delay unit A and the playback signal delay unit C;
said plurality of playback signal holding units have playback signal holding units A, B, and C for holding the output signals from the playback signal delay units A, B, and C at the timing of the phase reference signal, respectively;

said polarity inversion detection unit judges whether the polarities are inverted or not, on the basis of the output signals of the playback signal delay units A and C among the plural playback signal delay units; and said playback signal holding unit B outputs a basic signal for detecting phase error information from the output of the over sampling phase control unit.

23. A playback signal processing apparatus as defined in claim 22 wherein among the plurality of playback signal delay units, said playback signal delay unit A outputs a playback signal corresponding to a phase of zero of the channel bit clock whose cycle is expressed by $2\pi$ ($\pi$=ratio of the circumference of a circle to its diameter);

said playback signal delay unit C outputs a playback signal corresponding to a phase of $2\pi$ of the channel bit clock; and said playback signal delay unit B outputs a playback signal corresponding to a phase of $\pi$ of the channel bit clock.

24. A playback signal processing apparatus as defined in claim 19 wherein said phase synchronization control unit comprises:
a zerocross position detection unit for detecting zerocross position information of the output signal of the over sampling phase control unit,
a phase error information detection unit for detecting phase error information between the zerocross position information and the output signal of the over sampling phase control unit, and
a loop filter for smoothing the phase error information; and said phase synchronization control unit operates in synchronization with the cycle of the over sampling clock.

25. A playback signal processing apparatus as defined in claim 24 further including:

a playback signal delay unit A for outputting a playback signal which is positioned in a phase that is apart by a predetermined amount of phase from the reference phase of the channel bit clock whose cycle is expressed by $2\pi$ ($\pi$=ratio of the circumference of a circle to its diameter), a playback signal delay unit C for outputting a playback signal which is positioned in a phase that is apart by $2\pi$ from the playback signal delay unit A, and a playback signal delay unit B for outputting a playback signal that is positioned in a phase apart by $\pi$ from the playback signal delay unit A, which unit B is located midway between the playback signal delay unit A and the playback signal delay unit C;

wherein said phase error information detection unit controls the polarity of the output signal of the playback signal holding unit B to detect it as phase error information, among the playback signal holding units A, B, and C which hold the output signals of the playback signal delay units A, B, and C at the timing of the phase reference signal, respectively, when a polarity inversion detection unit for judging whether the polarities are inverted or not on the basis of the output signals of the playback signal delay units A and C judges that the polarities of the output signals of the playback signal delay units A and C among the plural playback signal delay units are inverted, and either the rising edge or the falling edge of the optical playback waveform is detected.

26. A playback signal processing apparatus as defined in claim 18 further including:

a digital data demodulation unit comprising a first demodulation unit for demodulating the first digital data, and a second demodulation unit for demodulating the second digital data or the third digital data.

27. A playback signal processing apparatus as defined in claim 26 wherein said digital data demodulation unit includes,
as the first demodulation unit, a PRML (Partial Response Maximum Likelihood) signal processing unit for estimating a most likely data string by utilizing an interference between codes which is intentionally added to the output signal of the operation cycle conversion unit, and
as the second demodulation unit, a level judgement binarization unit for demodulating digital data by binarizing the output signal of the operation cycle conversion unit on the basis of a center level of the output signal at which code balance is kept; and both of the PRML signal processing unit and the level judgement binarization unit are operated in synchronization with the channel bit clock.

28. A playback signal processing apparatus as defined in claim 27 further including:

a playback signal delay unit A for outputting a playback signal which is positioned in a phase that is apart by a predetermined amount of phase from the reference phase of the channel bit clock whose cycle is expressed by $2\pi$ ($\pi$=ratio of the circumference of a circle to its diameter), a playback signal delay unit C for outputting a playback signal which is positioned in a phase that is apart by $2\pi$ from the playback signal delay unit A, and a playback signal delay unit B for outputting a playback signal that is positioned in a phase apart by $\pi$ from the playback signal delay unit A, which unit B is located midway between the playback signal delay unit A and the playback signal delay unit C;

wherein said PRML signal processing unit demodulates data of a signal that is obtained by converting the operation cycle of the output signal of the playback signal holding unit B using the operation cycle conversion unit, among the playback signal holding units A, B, and C which hold the output signals of the playback signal delay units A, B, and C at the timing of the phase reference signal, respectively.

29. A playback signal processing apparatus as defined in claim 27 further including:

a playback signal delay unit A for outputting a playback signal which is positioned in a phase that is apart by a predetermined amount of phase from the reference phase of the channel bit clock whose cycle is expressed by $2\pi$ ($\pi$=ratio of the circumference of a circle to its diameter), a playback signal delay unit C for outputting a playback signal which is positioned in a phase that is apart by $2\pi$ from the playback signal delay unit A, and a playback signal delay unit B for outputting a playback signal that is positioned in a phase apart by $\pi$ from the playback signal delay unit A, which unit B is located midway between the playback signal delay unit A and the playback signal delay unit C;

wherein said level judgement binarization unit demodulates data of a pre-binarization signal that is obtained by converting the operation cycle of either of the output signals from the playback signal holding units A and C using the operation cycle conversion unit, among the playback signal holding units A, B, and C which hold the output signals of the playback signal delay units A, B, and C at the timing of the phase reference signal, respectively.

30. A playback signal processing apparatus as defined in claim 26 wherein
said digital data demodulation unit further includes a demodulation data switching unit and a selection unit; and
said selection unit selects either the output signal of the first demodulation unit or the output signal of the second demodulation unit using a selection signal from the demodulation, and outputting the selected signal as demodulated data.

31. A playback signal processing apparatus as defined in claim 19 wherein
said over sampling phase synchronization unit further includes an offset correction unit for reducing an offset component in the amplitude direction from the multiple-bit discrete signal, and outputting the signal to the over sampling phase control unit.

32. A playback signal processing apparatus as defined in claim 31 wherein said offset correction unit comprises:
an offset level detection unit for detecting offset level information in the amplitude direction from the output signal of the over sampling phase control unit;
an offset level smoothing unit for smoothing the offset level information in the amplitude direction; and
an offset level subtraction unit for subtracting the output signal of the offset level smoothing unit from the multiple-bit discrete signal to reduce the offset component.

33. A playback signal processing apparatus as defined in claim 18 further including:
a playback signal delay unit A for outputting a playback signal which is positioned in a phase that is apart by a predetermined amount of phase from the reference phase of the channel bit clock whose cycle is expressed by $2\pi$ ($\pi$=ratio of the circumference of a circle to its diameter),
a playback signal delay unit C for outputting a playback signal which is positioned in a phase that is apart by $2\pi$ from the playback signal delay unit A, and
a playback signal delay unit B for outputting a playback signal that is positioned in a phase apart by $\pi$ from the playback signal delay unit A, which unit B is located midway between the playback signal delay unit A and the playback signal delay unit C;
wherein said jitter detection unit comprises:
a jitter element detection unit for detecting an absolute value component in the amplitude direction at a zero-cross point, from the output signal of the playback signal holding unit B among the playback signal holding units A, B, and C for holding the output signals of the playback signal delay units A, B, and C at the timing of the phase reference signal, respectively, and the output signal of the polarity inversion detection unit for judging whether the polarities are inverted or not on the basis of the output signals of the playback signal delay units A and C;
a jitter reference cycle detection unit for calculating a distance in the amplitude direction from the output signals of the playback signal holding units A and C among the plurality of playback signal holding units; and
an absolute jitter component detection unit for detecting a jitter component by subtracting the output signal of the jitter element detection unit by the output signal of the jitter reference cycle detection unit.

34. An optical disc device comprising:
a spindle motor for rotating an optical disc;
an optical pickup for reading a playback signal from the optical disc;
a playback signal processing apparatus defined in claim 18, for processing the playback signal that is read by the optical pickup;
a decoding circuit for demodulating the signal processed by the playback signal processing apparatus, and subjecting the demodulated signal to error processing;
a servo control circuit for controlling the spindle motor and the optical pickup; and
a system controller for carrying out data communication with external devices, and controlling the respective function blocks.

* * * * *